United States Patent
Zisimopoulos et al.

(10) Patent No.: US 11,785,576 B2
(45) Date of Patent: Oct. 10, 2023

(54) RELAY DISCOVERY IN WIRELESS COMMUNICATION SYSTEMS

(71) Applicant: QUALCOMM Incorporated, San Diego, CA (US)

(72) Inventors: Haris Zisimopoulos, London (GB); Lenaig Genevieve Chaponniere, La Jolla, CA (US); Hong Cheng, Basking Ridge, NJ (US); Karl Georg Hampel, Jersey City, NJ (US); Sebastian Speicher, Wallisellen (CH); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/878,803

(22) Filed: Aug. 1, 2022

(65) Prior Publication Data

US 2022/0369276 A1    Nov. 17, 2022

Related U.S. Application Data

(62) Division of application No. 16/996,814, filed on Aug. 18, 2020, now Pat. No. 11,496,987.

(30) Foreign Application Priority Data

Sep. 16, 2019  (GR) ................................ 20190100399

(51) Int. Cl.
*H04W 64/00*    (2009.01)
*H04W 76/27*    (2018.01)
(Continued)

(52) U.S. Cl.
CPC .......... *H04W 64/003* (2013.01); *H04W 4/70* (2018.02); *H04W 8/005* (2013.01);
(Continued)

(58) Field of Classification Search
CPC ..... H04W 64/003; H04W 4/70; H04W 8/005; H04W 64/006; H04W 76/11;
(Continued)

(56) References Cited

U.S. PATENT DOCUMENTS

| 10,075,217 B1 | 9/2018 | Sung et al. |
| 2012/0207078 A1 * | 8/2012 | Hwang ................. H04W 80/02 370/315 |

(Continued)

FOREIGN PATENT DOCUMENTS

| EP | 2983426 A1 * | 2/2016 | .......... H04W 40/246 |
| EP | 3363225 A1 | 8/2018 | |
| WO | 2014060032 A1 | 4/2014 | |

OTHER PUBLICATIONS

Fujitsu Limited; The remote UE access to relay UE served by one neighbor cell; 3GPP TSG-RAN WG2 Meeting#91bis R2-154308 Malmo, Sweden, Oct. 5-9, 2015 (Year: 2015).*

(Continued)

*Primary Examiner* — Hirdepal Singh
(74) *Attorney, Agent, or Firm* — Procopio, Cory, Hargreaves & Savitch LLP

(57) ABSTRACT

A configuration for dynamically updating the neighbor list sent to a UE based on the location of the UE and the location of one or more mobile relays. The apparatus receives first location information for one or more UEs. The apparatus receives second location information for one or more mobile relays. The apparatus determines a distance between the one or more UEs and each of the one or more mobile relays. The apparatus sends assistance information to at least one of the one or more UEs in an area, the assistance information identifying at least one mobile relay of the one or more mobile relays based on the determined distance between the one or more UEs and the at least one mobile relay.

16 Claims, 22 Drawing Sheets

(51) Int. Cl.
*H04W 76/11* (2018.01)
*H04W 4/70* (2018.01)
*H04W 8/00* (2009.01)
*H04W 92/18* (2009.01)

(52) U.S. Cl.
CPC .......... *H04W 64/006* (2013.01); *H04W 76/11* (2018.02); *H04W 76/27* (2018.02); *H04W 92/18* (2013.01)

(58) Field of Classification Search
CPC ..... H04W 76/27; H04W 92/18; H04W 4/023; H04W 36/00835; H04W 88/04; H04W 84/047; H04W 48/12; H04W 64/00; H04W 48/06
USPC ...................................................... 455/456.1
See application file for complete search history.

(56) References Cited

U.S. PATENT DOCUMENTS

| | | | |
|---|---|---|---|
| 2013/0100877 A1 | 4/2013 | Moberg et al. | |
| 2015/0024757 A1* | 1/2015 | Bulakci | H04W 36/0072 455/437 |
| 2016/0205499 A1 | 7/2016 | Davydov et al. | |
| 2018/0278325 A1 | 9/2018 | Feki et al. | |
| 2019/0387429 A1* | 12/2019 | Basu Mallick | H04W 40/24 |
| 2020/0008030 A1 | 1/2020 | Kim et al. | |
| 2020/0344708 A1* | 10/2020 | Liao | H04W 76/14 |
| 2020/0350968 A1* | 11/2020 | Tsai | H04L 1/0026 |
| 2021/0136628 A1 | 5/2021 | Uchiyama | |
| 2021/0195503 A1 | 6/2021 | Tang | |

OTHER PUBLICATIONS

Fujitsu Limited: "The Remote UE Access to Relay UE Served by One Neighbor Cell", 3GPP TSG-RAN WG2 Meeting#91 bis, 3GPP Draft; R2-154308, 3rd Generation Partnership Project (3GPP), Mobile Competence Centre; 650, Route Des Lucioles; F-06921 Sophia-Anti, vol. RAN WG2, No. Malmo, Sweden; Oct. 5, 2015-Oct. 9, 2015, Oct. 4, 2015 (Oct. 4, 2015), pp. 1-4, XP051004855, Retrieved from the Internet: URL: http://www.3gpp.org/ftp/Meetings_3GPP_SYNC/RAN2/Docs/ [retrieved on Oct. 4, 2015] pp. 2-3.

International Preliminary Report on Patentability—PCT/US2020/047003, The International Bureau of WIPO—Geneva, Switzerland, dated Mar. 31, 2022.

International Search Report and Written Opinion—PCT/US2020/047003—ISA/EPO—dated Feb. 10, 2021.

NEC: "ProSe Relay Discovery Assisted by E-UTRAN", 3GPP TSG SA WG2 Meeting #99, 3GPP Draft, S2-133376, Prose Relay V0-2, 3rd Generation Partnership Project (3GPP), Mobile Competence Centre, 650, Route Des Lucioles, F-06921 Sophia-Antipolis Cedex, France, vol. SA WG2, No. Xiamen, P.R. China, Sep. 23, 2013-Sep. 27, 2013, Sep. 18, 2013 (Sep. 18, 2013), 4 Pages, XP050726730, Retrieved from the Internet: URL: https://www.3gpp.org/ftp/tsg_sa/WG2_Arch/TSGS2_99_Xiamen/Docs/ [retrieved on Sep. 18, 2013], p. 2.

European Search Report—EP22210636—Search Authority—Munich—dated Jan. 17, 2023.

* cited by examiner

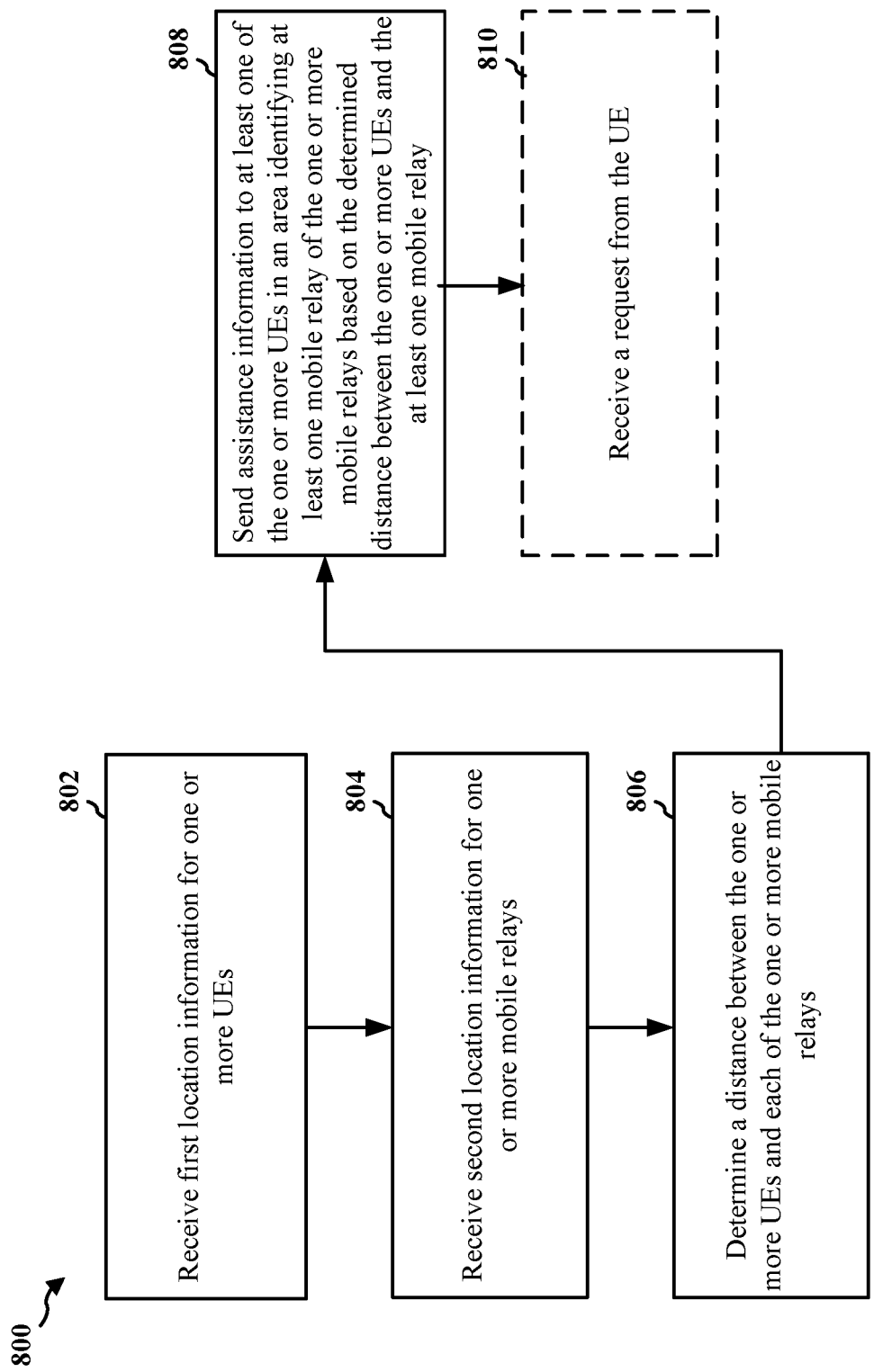

RELAY DISCOVERY IN WIRELESS COMMUNICATION SYSTEMS

CROSS-REFERENCE TO RELATED APPLICATION(S)

This application is a Divisional of U.S. patent application Ser. No. 16/996,814, entitled "RELAY DISCOVERY IN WIRELESS COMMUNICATION SYSTEMS" and filed on Aug. 18, 2020, which claims the benefit of Greek Application Serial No. 20190100399, entitled "RELAY DISCOVERY IN WIRELESS COMMUNICATION SYSTEMS" and filed on Sep. 16, 2019, the contents of which are expressly incorporated by reference herein in their entirety.

BACKGROUND

Technical Field

The present disclosure relates generally to communication systems, and more particularly, to discovery of relays in wireless communication systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In wireless communication systems (e.g., 5G NR), base stations may have a limited coverage area. Including relay nodes in the wireless communication system allows the relay node to provide additional coverage that may not be provided by the limited coverage area of a base station. Relay nodes can relay the signal from the base station and can expand or enhance the serving area of the base station. Relay nodes may be stationary or they may be mobile. For mobile relays, a relay is placed in a vehicle and may provide coverage to neighboring User Equipments (UEs), which can be in the vehicle itself or in the vicinity of the vehicle. The relay obtains signal coverage from a stationary base station (e.g., gNodeB (gNB)) in the wireless network. These base stations may be known as donor gNBs.

Base stations may maintain neighbor lists which contain a list of neighboring cells. In wireless communication systems, the base stations are fixed and stationary, such that the list of neighboring cells that a UE is expected to see and potentially handover to is known and fixed. However, in wireless communication systems that include relays, e.g., mobile relays, the relays that provide service to UEs may be mobile, such that a list of neighboring relays that the UE is expected to see on a particular relay may repeatedly change. A UE in idle mode, camped on a mobile relay, may select the best cell based on the UE's scanning, which may lead to increased reselections and inefficient use of resources. A UE in connected mode, camped on a mobile relay, may be configured to receive updated neighbor lists to ensure successful handovers to neighboring relays. Aspects provided herein provide a solution to the problem of dynamically updating the neighbor list sent to the UE, based on the location of the UE and/or the location of the relays populating a known cell or another region in the vicinity of the UE at a given time.

In an aspect of the disclosure, a method, a computer-readable medium, and an apparatus are provided. For example, according to one aspect, a method of wireless communication for a network entity is disclosed. The network entity receives first location information for one or more user equipments (UEs), and second location information for one or more mobile relays. The network entity determines a distance between the one or more UEs and each of the one or more mobile relays. The network entity sends assistance information to at least one of the one or more UEs in an area, the assistance information identifying at least one mobile relay of the one or more mobile relays based on the determined distance between the one or more UEs and the at least one mobile relay.

According to another aspect of the disclosure, a method of wireless communication at a user equipment (UE) is disclosed. The UE provides location information for the UE to a base station. The UE receives, from a network entity, assistance information identifying at least one mobile relay within a distance of the UE.

According to another aspect of the disclosure, a method of wireless communication at a mobile relay device is disclosed. The mobile relay device determines if the mobile relay device is capable of supporting an additional user equipment (UE) based on a current load of the mobile relay device. The mobile relay device transmits an indication indicating whether the mobile relay device is capable of accepting the additional UE.

According to another aspect of the disclosure, a method of wireless communication at a base station is disclosed. The base station determines if the base station is capable of supporting an additional mobile relay based on a current load of the base station. The base station transmits an indication indicating whether the base station is capable of accepting the additional mobile relay.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is a flowchart of a method of wireless communication.

DETAILED DESCRIPTION

Figure 1:
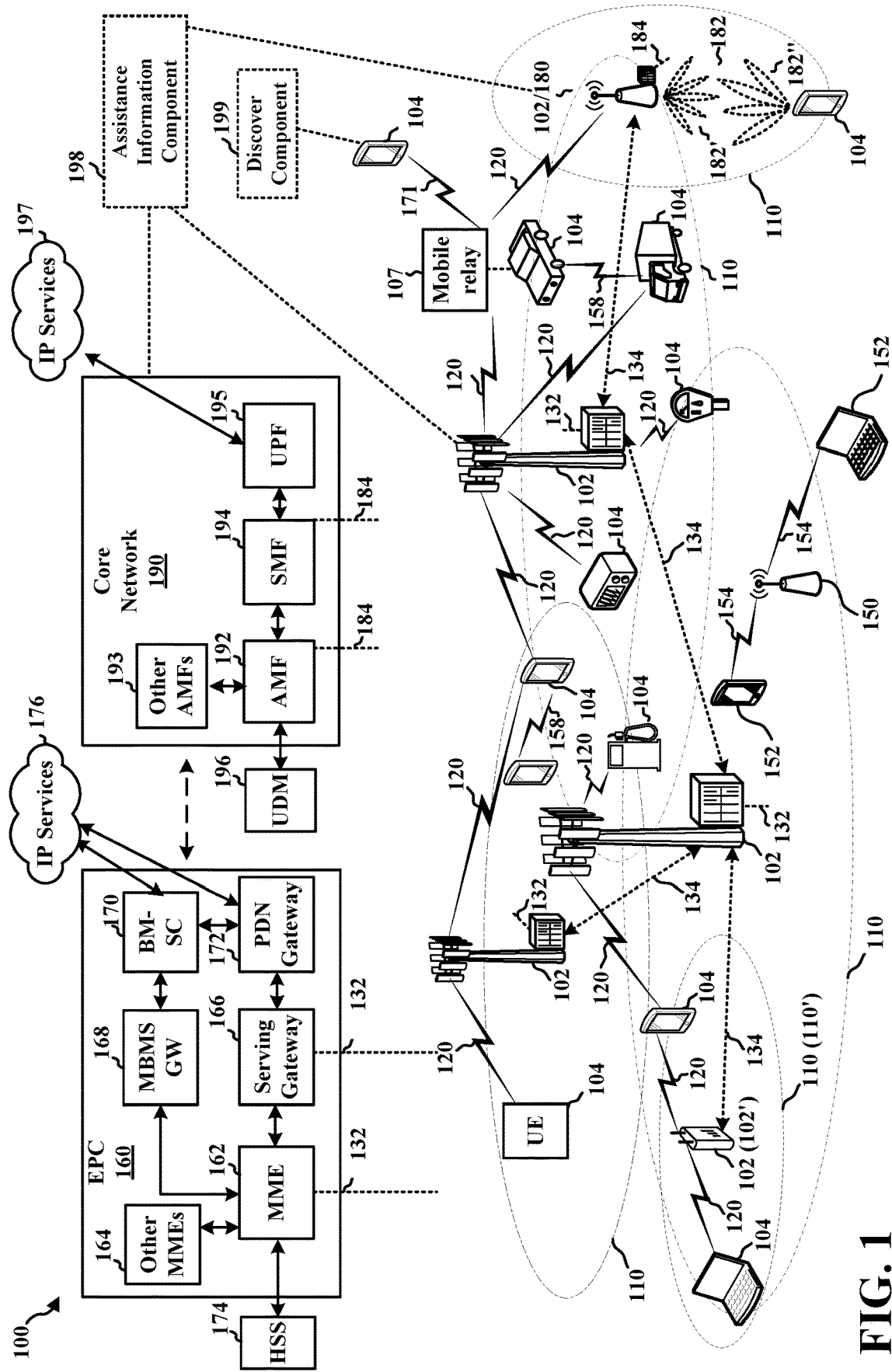
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE- PROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL).

The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations 180, such as a gNB, may operate in a traditional sub 6 GHz spectrum, in millimeter wave (mmW) frequencies, and/or near mmW frequencies in communication with the UE 104. When the gNB operates in mmW or near mmW frequencies, the gNB may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station, e.g., the base station 180, may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102/180 may be configured to determine which mobile relays are within the vicinity of a UE and send this information to the UE. For example, a network entity in FIG. 1 may include an assistance information component 198 configured to provide assistance information to the UE identifying at least one mobile relay based on the distance between the UE and the at least one mobile relay, such as mobile relay 107. The network entity may comprise a base station 102 or 180 or may comprise a component of a core network, such as core network 190 or EPC 160. The network entity may receive location information from UE(s) and mobile relay(s), and determine a distance between the UE(s) and the mobile relay(s).

Referring again to FIG. 1, in certain aspects, the UE 104 may be configured to discover mobile relays that may be within the vicinity of the UE. For example, the UE 104 of FIG. 1 may include a discover component 199 configured to perform discovery for a mobile relay 107 based on assistance information received from a network entity. The UE 104 may provide location information to a base station, and may receive, from a network entity, assistance information that identifies at least one mobile relay within a distance of the UE. The UE may establish a connection 171 with the mobile relay to communication information to the network, e.g., to a base station 102 or 180.

Although the following description may be focused on 5G NR, the concepts described herein may be applicable to other similar areas, such as LTE, LTE-A, CDMA, GSM, and other wireless technologies.

Figure 2A:
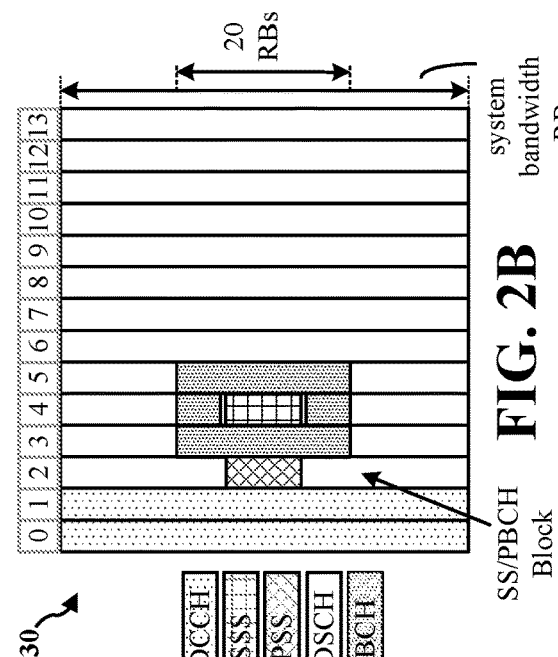
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.
Figure 2B:
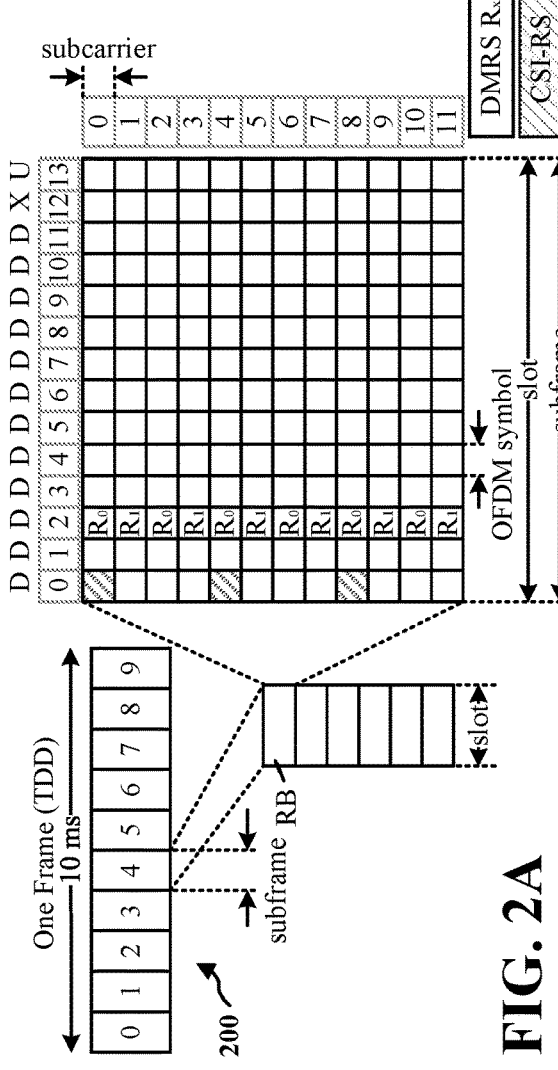
Figure 2C:
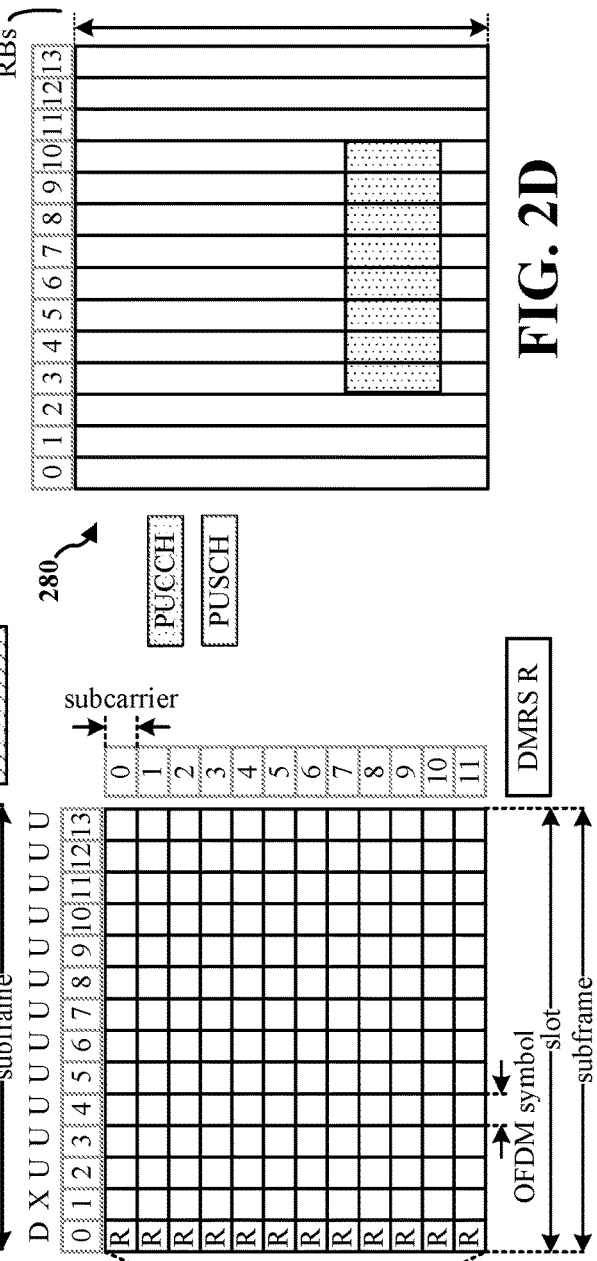
Figure 2D:
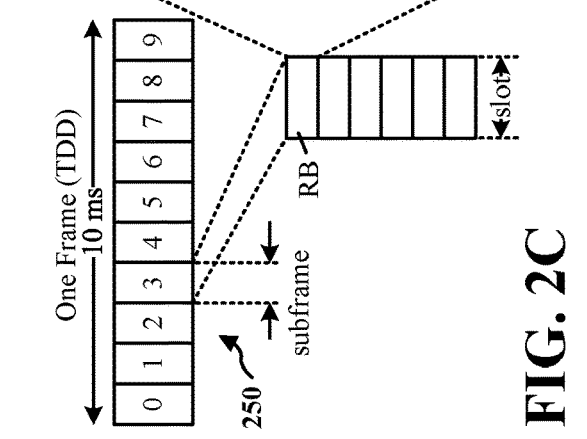

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$. 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
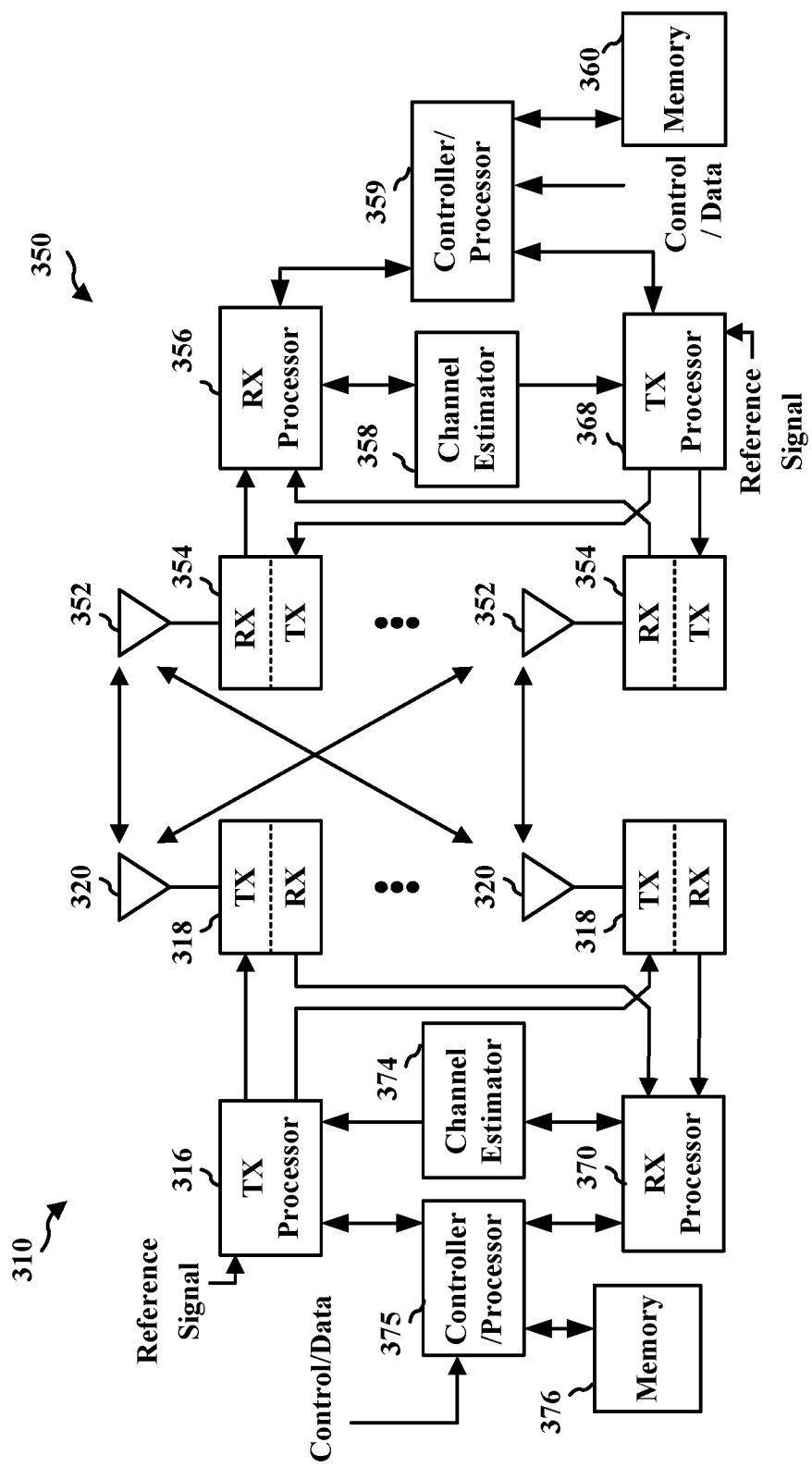
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 199 of FIG. 1.

At least one of the TX processor 316, the RX processor 370, and the controller/processor 375 may be configured to perform aspects in connection with 198 of FIG. 1.

A communication system, such as a 5G NR communication system, may have some base stations that have a limited coverage area. The limited coverage area may be due to environmental factors, such as a base station being in a dense urban environment, signals being blocked by terrain, among other examples. Relay nodes may provide additional coverage in the communication system that may not be provided by the base station. Relay nodes relay a signal from the base station and may expand or enhance the serving area of the base station by relaying communication between one or more UEs and the base station. Relay nodes may be used to fill coverage gaps of the serving area of the base station, for example, without installation of an additional base station. A relay node may have a connection to a base station, which may be referred to as a donor base station. As an example, a base station providing coverage for a relay may be referred to as a donor gNB. Once connected, a relay node may relay the signal from the donor base station, thereby expanding or improving the coverage of the base station. Relay nodes may be stationary. In some examples, a relay node may be mobile and may move within the coverage area of the base station or may move out of the coverage area of the base station. For mobile relays, a relay may be located in a vehicle, such as a bus, taxi, train, or car, among others. The mobile relay may provide coverage to neighboring UEs, which can be in the vehicle itself or in the vicinity of the vehicle.

Figure 4:
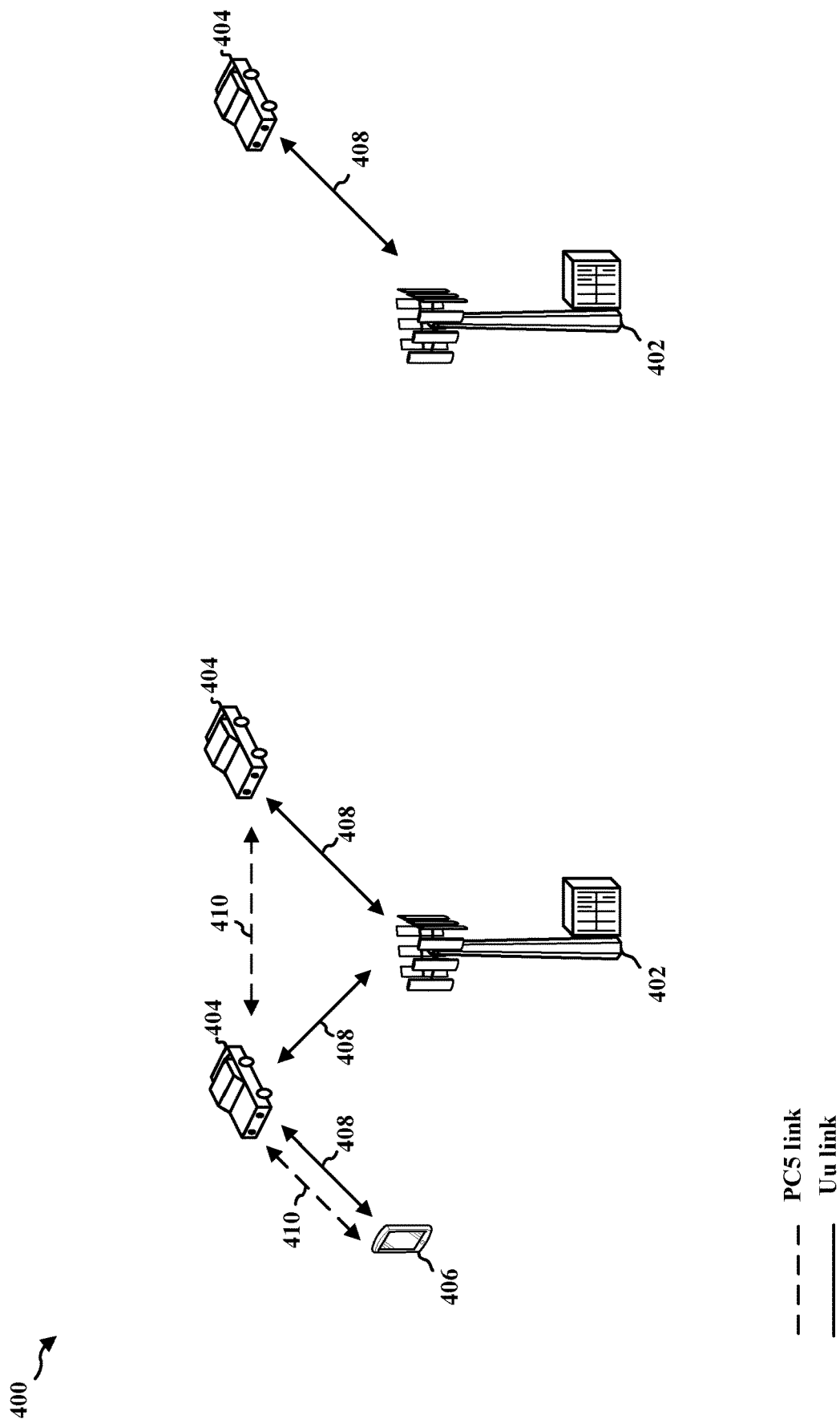
FIG. 4 is a diagram illustrating an example of a base station, a UE, and a mobile relay in an access network in accordance to certain aspects of the disclosure.

FIG. 4 is a diagram illustrating an example of a base station 402, a UE 406, and a mobile relay 404 in an access network 400 in accordance to certain aspects of the disclosure. In some examples, an access network including mobile relays may be referred to as a fleet network, or a FleetNet system. The example diagram 400 of FIG. 4 includes a base station 402 (e.g., gNB), mobile relays 404, and a UE 406. The mobile relay 404 may be connected to the base station 402, such that the base station 402 is a donor base station (e.g., donor gNB). The radio link, e.g., link 408, between the mobile relay 404 and the base station 402 may be an Uu link 408, such as based on Uu NR. The link between the mobile relay 404 and the UE may include a Uu link 408 or a PC5 link 410, such as based on Uu NR and/or PC5 NR. In some aspects, neighboring mobile relays 404 may be configured to communicate with each other via a link 410 based on PC5. A Uu interface is the radio interface between a mobile device (e.g., UE) and the radio access network. For example, a Uu interface may include an interface between a UE and a base station for communication between the UE and the network. The Uu interface may include both the user plane and the control plane signaling and/or data streams. In some aspects, messages for the Uu interface may be carried over a D2D link, such as the PC5 link 410. Therefore, the PC5 link 410 may be configured to carry the signaling and/or messages for the Uu interface in order to provide communication between the UE 406 and the base station 402. PC5 is an example, of a D2D link directly between devices that supports communication directly between the devices without passing the communication through a base station. Such a D2D link may support sidelink communication between the two devices.

The mobile nature of mobile relays 404 may lead to unique challenges in a communication system in which the UEs 406 use mobile relays 404 to communicate with the network, e.g., with base station 402.

In some examples, a UE 406 may need to perform frequent reselections to a new mobile relay 404. Aspects presented herein may help the UE 406 to search for mobile relays 404 and/or select mobile relays 404 in a more efficient manner.

A base station 402 may maintain neighbor lists that contain a list of neighboring cells. There can be different types of neighbor lists. For example, an internal neighbor list may be maintained by the base station 402 with a list of neighboring cells for a particular served cell. A broadcast neighbor list may be broadcast by the base station 402 in the system information block (SIB) for use by UEs 406 in an idle mode. For intra-frequency and inter-frequency cells, the serving cell may not provide an explicit neighbor list and may provide carrier frequency information and bandwidth information only. However, providing an explicit neighbor list (e.g., a list of Physical Cell Identities (PCIs)) per carrier frequency enables the network to configure cell-specific reselection parameters that can be specified on a per-cell basis. This includes a Q-offset value that biases the reselection either for or against the cell relative to the other cells by modifying its rank. Cells can also be explicitly called out as blacklisted to help a UE 406 avoid reselection to such cells. In another example, a dedicated neighbor list may be sent by the base station 402 to a UE 406, e.g., in a connected mode with the base station 402. The dedicated neighbor list may include a list of PCI per carrier frequency, e.g., having an optional offset for each PCI. Providing the list of PCIs and associated offsets to the UE 406 may help the UE 406 to perform measurements on neighbor cells more quickly.

Base stations 402 may often be stationary, so that the list of neighboring cells of neighbor base stations may be relatively fixed. Thus, the neighboring cells that the UE 406 is expected to detect for potential handovers may also be relatively fixed. As such, the base station 402 might not send an explicit neighbor list to a UE 406 in an idle mode. However, in wireless communication systems that include mobile relays 404 that provide service to mobile UEs 406, the neighboring relays for the UE 406 may continually change.

A UE 406 in an idle mode may select a best cell (whether for a base station or a mobile relay) based on a scanning procedure performed by the UE 406. A UE 406 camped on a mobile relay 404 may perform frequent reselections to a new mobile relay 404 due to the mobility of the mobile relay 404 and/or the UE 406. The frequent reselections may expend considerable resources at the UE 406. As presented herein, a base station 402 may provide a neighbor list to a UE 406 in idle mode and camped on a mobile relay 404 to assist in reducing the amount of reselections performed by the UE 406 and/or improving the efficiency of the reselection performed by the UE 406. A base station 402 providing a neighbor list to a UE 406 in a connected mode may also assist in ensuring successful handovers for the UE 406. Aspects presented herein may enable a UE 406 camped on a mobile relay 404 to identify neighboring relays based on assistance information provided by a base station 402. The base station 402 may update the assistance information, such as a neighbor list, sent to the UE 406 based on the UE's location and/or the locations of the mobile relays 404.

Each cell served by a base station 402 may be dimensioned according to the number of UEs that the cell is expected to serve, and/or based on the density of the area within its coverage area in terms of population. However, in communication systems that include mobile relays 404, the number of users served by a mobile relay 404, and the number of mobile relays served by a base station 402, might not be accurately predicted due to the mobility of the mobile relays 404 relative to a base station 402 and due to movement of the mobile relays 404 and the UEs 406 relative to each other. Aspects presented herein enable the load of the mobile relay 404 and/or the donor base station, e.g., base station 402, to be taken into account prior to a UE 406, in idle mode, reselecting from one mobile relay 404 to another, prior to a mobile relay 404 reselecting from one donor base station to another donor base station, prior to a donor base station handing over a mobile relay to another donor base station, or prior to a UE 406, in a connected mode, being handed over to another mobile relay 404.

Each cell may be associated with a particular PCI. For example, cells with a same PCI may be distinguished by an unique Cell Global Identifiers (NCGI) of a respective cell. The PCI may be carried by PSS/SSS in a SSB block from the cell. The PCI may be used to determine scrambling sequence of a physical signal or physical channels transmitted by the cell. As an example, any of a Physical Broadcast Channel (PBCH), a PDCCH (e.g., PDCCH CoreSet0), a cell-specific PDSCH transmission, etc. from the cell may be scrambled based on the PCI for the cell. For example, the PCI may be used as a scrambling seed for scrambling the channels. Other channels may be scrambled based on another scrambling seed. The number of possible PCI values may be limited, and the PCI may be reused across a network. In some examples, PCI values may be reused by multiple geographically separated cells in a network.

However, a mobile relay 404 having a particular PCI may come into proximity with another cell having the same PCI. As signals from the mobile relay node 404 and the other cell may both be scrambled based on the same PCI, a UE 406 receiving the signals may not be able to correctly identify the source of the signal, e.g., may be unable to differentiate between a signal from the mobile relay 404 and a signal from the other cell. The use of a same PCI value by the mobile relay 404 and another cell within proximity of the mobile relay may be referred to as a PCI collision. PCI collisions may lead to issues with timing synchronization and channel estimation, and may further cause decoding failures for data traffic transmitted from at least one of these two neighboring cells.

Mobile relays 404 may have an output power that is significantly lower than the output power of a base station 402. The lower output power of the mobile relays 404 may lead to more frequent handovers than for a base station 402.

Figure 5:
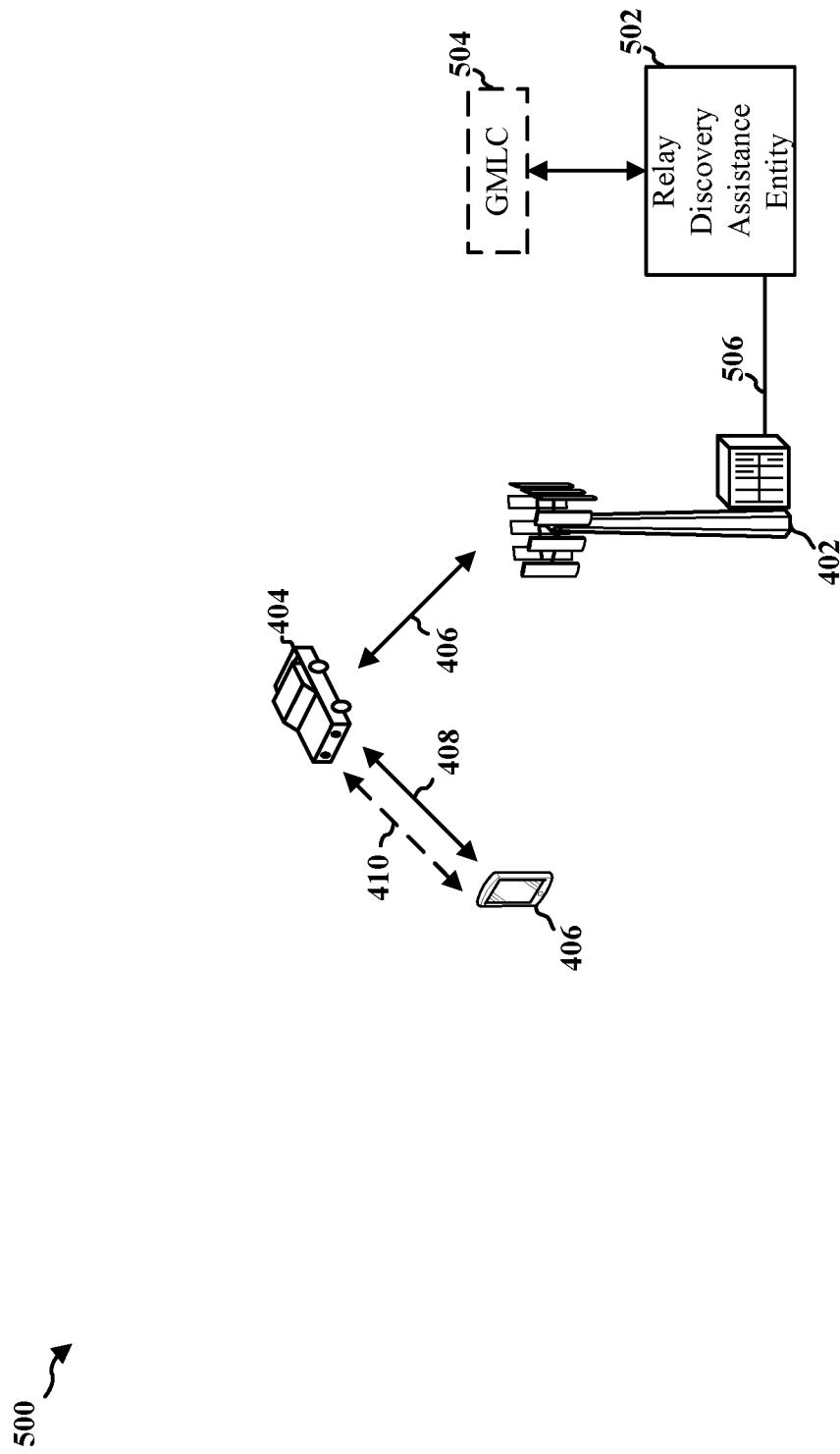
FIG. 5 is a diagram illustrating an example communication system including a base station, UE, and a mobile relay in an access network in accordance to certain aspects of the disclosure.

FIG. 5 is a diagram illustrating an example communication system 500 including a base station 402, UE 406, and a mobile relay 404 in an access network in accordance with certain aspects of the disclosure. Similar reference numbers to FIG. 4 are used to designate similar aspects of FIG. 5. However, the communication system 500 further includes a relay discovery assistance entity 502 and may include a gateway mobile location center (GMLC) 504. Once the UE 406 is connected to the network via the mobile relay 404, both the UE 406 and mobile relay 404 may periodically report their position to a network entity.

In some aspects, the network entity may be configured to act as an application function (AF) and may send a request to the GMLC 504 to obtain the location of the mobile relay 404 and the UE 406. After receipt of the location information of the mobile relay 404 and the UE 406 from the GMLC 504, the network entity may determine the relative proximity between the UE 406 and the mobile relay 404.

In some aspects, the network entity may be a relay discovery assistance entity 502 that is separate from the base station 402, while having an interface 506 with the base station 402. However, the disclosure is not intended to be limited to the aspects disclosed herein.

In some aspects, the base station 402 may be configured to be the network entity. The base station may comprise the relay discovery assistance entity 502 that provide s assistance information to the UE for use in selecting a mobile relay.

In some aspects, the mobile relay 404 and UE 406 may be configured to provide their position to the network entity (e.g., relay discovery assistance entity 502) by way of the base station 402.

Figure 6:
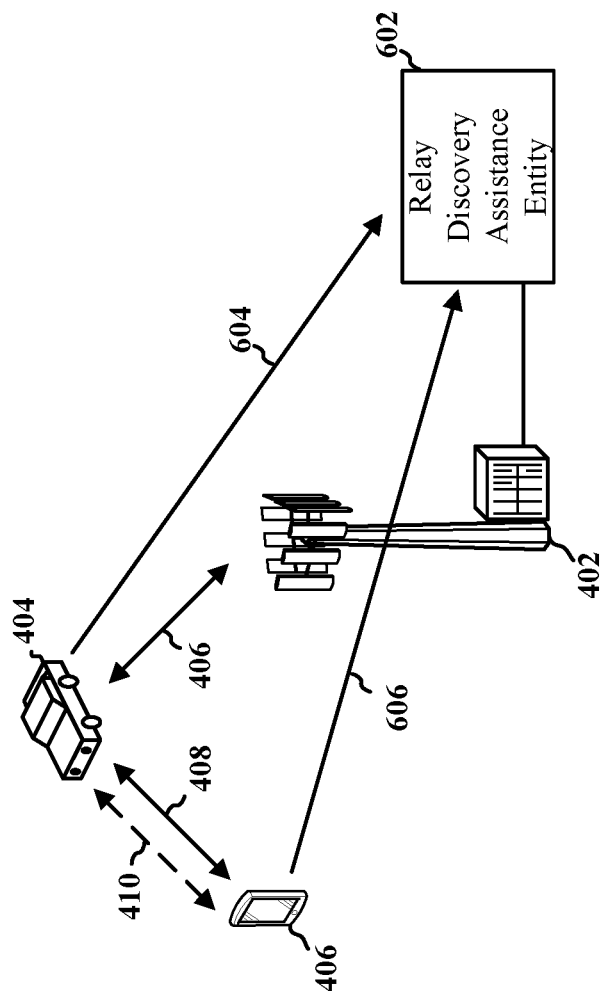
FIG. 6 is a diagram illustrating an example communication system including a base station, UE, and a mobile relay in an access network in accordance to certain aspects of the disclosure.

In some examples, such as when the base station 402 acts as the network entity, the mobile relay 404 and the UE 406 may provide their position directly to the base station 402, such as illustrated in FIG. 6. For example, mobile relay 404 may provide its location to the network entity (e.g., relay discovery assistance entity 602) via link 604, while the UE 406 may provide its location to the network entity (e.g., relay discovery assistance entity 602) via link 606. In aspects, where the base station 402 is the network entity, the mobile relay 404 may provide its location to the base station via link 604, while the UE 406 may provide its location to the base station by transmitting it directly to the base station via link 606 or by way of the mobile relay 404. However, in some aspects as shown in FIG. 5, the mobile relay 404 and UE 406 may be configured to provide their position directly to another network entity (e.g., to a GMLC 504) from which the relay discovery assistance entity 502 receives the location information.

FIGS. 5 and 6 only illustrate a single UE 406 and a single mobile relay 404 to illustrate the principles herein. However, the aspects presented herein may be employed for one or more UEs and one or more mobile relays.

Upon receipt of the location information of the one or more mobile relays 404 and the one or more UEs 406, the network entity (e.g., base station 402 or relay discovery assistance entity 502) may utilize the location information to determine which mobile relays are within the vicinity of the one or more UEs 406. The network entity (e.g., base station 402 or relay discovery assistance entity 502) may generate assistance information related to the other relays that are within the vicinity of the one or more UEs 406. In some aspects, the network entity (e.g., base station 402 or relay discovery assistance entity 502) may send the assistance information to a UE 406 via dedicated signaling, or may broadcast the assistance information in SIB. The assistance information may help a UE 406 to discover mobile relay(s) within the vicinity of the UE.

Figure 7A:
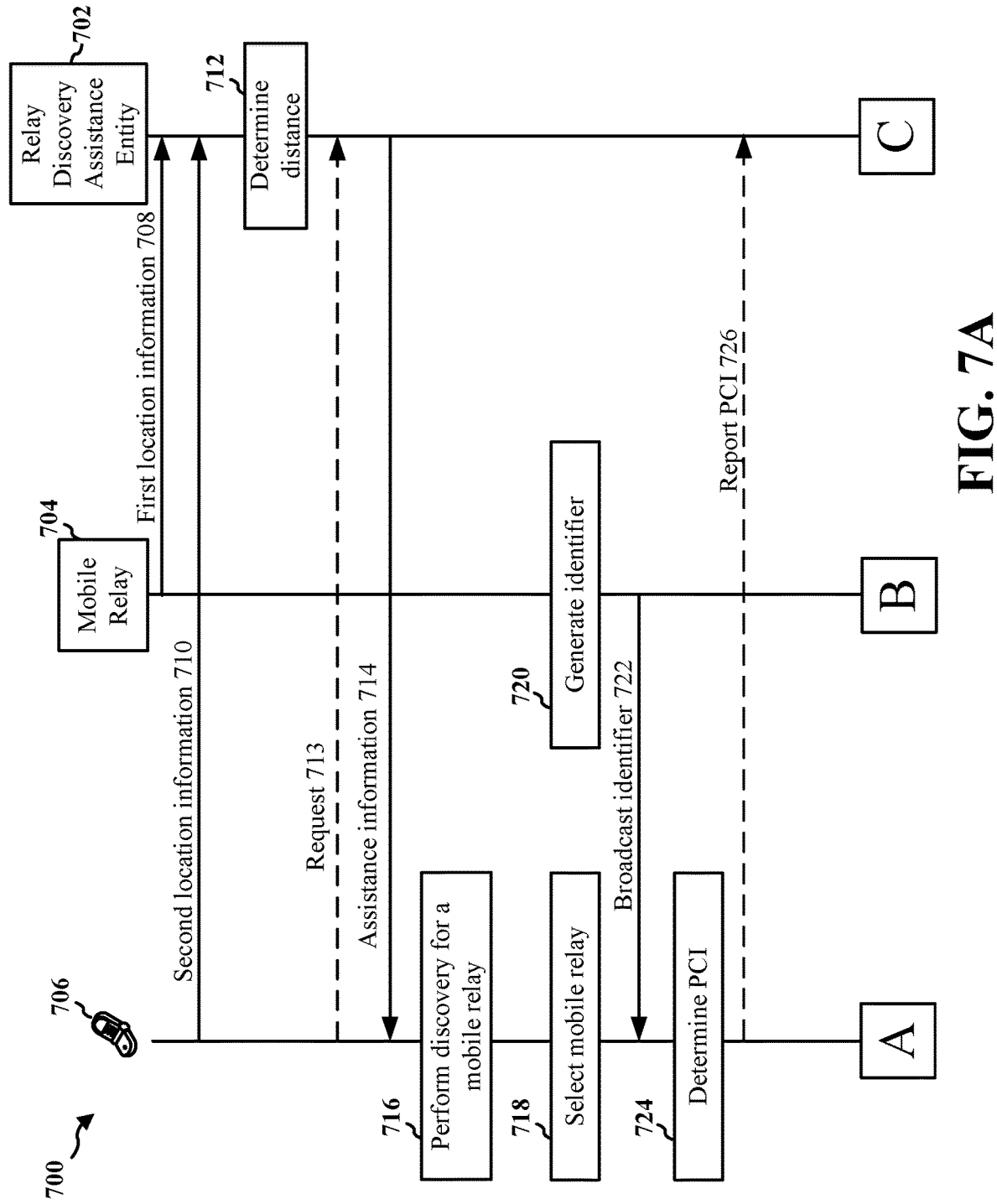
FIG. 7A is a call flow diagram of signaling between a UE, relay, and base station in accordance to certain aspects of the disclosure.

FIG. 7 illustrates an example communication flow 700 between a UE 706, a relay discovery assistance entity 702, and a mobile relay 704. The relay discovery assistance entity 702 may include a component of a base station or may correspond to a base station. The relay discovery assistance entity 702 may correspond to a core network entity, and may have an interface to a base station. As described in connection with FIGS. 5 and 6, the relay discovery assistance entity 702 may receive location information 710 from the UE 706 and location information 708 from the mobile relay 704. Although only a single UE 706 and a single mobile relay 704 are used to illustrate the concepts in FIG. 7, the aspects may be applied for multiple UEs and multiple mobile relays. Therefore, the relay discovery assistance entity 702 may receive location information for multiple UEs 706. The relay discovery assistance entity 702 may receive location information for multiple mobile relays 704. As described in connection with FIG. 5, the relay discovery assistance entity 702 may receive the location information from another network entity, such as from a GMLC. The relay discovery assistance entity 702 may receive the location updates directly from the UE 706 and/or the mobile relay 704, as described in the example in FIG. 6. As illustrated at 712, the relay discovery assistance entity 702 may determine a distance between the UE 706 and the mobile relay 704, and may similarly determine a distance between multiple UEs and each of one or more mobile relays. The relay discovery assistance entity 702 may use the determination, at 712, to identify mobile relays within a certain area or a certain range of the UE(s). The relay discovery assistance entity 702 may then send assistance information 714 to the UE 706.

The relay discovery assistance entity 702 may send the assistance information 714 to the UE via dedicated signaling. If there are multiple UEs, the relay discovery assistance entity 702 may send assistance information 714 to each of the UEs in dedicated signaling for the respective UE. Alternately, the assistance information 714 may be broadcast by a base station in system information, such as a SIB.

The assistance information 714 may be sent to the UE in a different frequency band than other service for the UE, e.g., user data transfer for the UE. Therefore, the assistance information 714 may be sent in a different frequency band than other communication from the base station to the UE. As the assistance information may not need a high data rate, the assistance information may be sent with a lower bit rate that data for the UE, e.g., in order to save radio resources.

The relay discovery assistance entity 702, or another network entity, may restrict the list of available relays that is provided to the UE. The restricted list may indicate that the UE is restricted to camping on the mobile relays on the list. For example, the restricted list may be used to minimize the number of reselections performed by the UE. The relay discovery assistance entity 702 can send the restricted list information to the UE in dedicated signaling to the UE. The relay discovery assistance entity 702 may provide the restricted list to the UE in response to a request 713 from the UE. The information may be sent in system information. For example, the restricted list, or other assistance information, may be provided to the UE via an on-demand SIB that is transmitted in response to a request 713 from the UE. The restricted list may include information that is customized to the UE that requested the restricted list. Similarly, other assistance information that is transmitted to the UE may be customized to the UE.

The UE 706 may use the assistance information 714, provided by the relay discovery assistance entity 702, to perform discovery for mobile relays, at 716. The UE 706 may use the assistance information to monitor for signals from mobile relays.

The UE 706 may fall back to a base station when the UE does not find any of the relays indicated in the list, e.g., a restricted list provided by the relay discovery assistance entity 702. The ability to fallback to a connection with a base station may help to avoid having the UE 706 enter an out-of-service state if the UE 706 is unable to discover any of the mobile relays indicated by the network.

In some aspects, the UE 706 may use direct discovery over a PC5 interface to discover mobile relays on which the UE can camp. For example, the mobile relay 704 may broadcast an ID 722 over PC5 with PCI information. As an example, the mobile relay 704 may broadcast a short ID of approximately 2-3 bytes from which the UE can deduce the PCI of the mobile relay 704. Then the UE would acquire the PCI for the relays in proximity. The mobile relay 704 may generate the identifier at 720, based on the PCI for the mobile relay 704. The UE 706 may use the broadcast ID 722 to determine the PCI for the mobile relay 704, at 724. As illustrated at 726, the UE 706 may report the discovered mobile relays to a network entity (e.g., a base station or other relay discovery assistance entity 702). For example, the report of discovered mobile relays may assist a donor base station in maintaining a current, accurate list of neighboring mobile relays.

In some aspects load information may be advertised. The load information may be taken into account before camping decisions involving a mobile relay are made. A mobile relay 704 may broadcast an indication 730 of whether the mobile relay 704 is capable of accepting additional UEs. The mobile relay 704 may determine, at 728, whether the mobile relay is capable of supporting an additional UE. The indication 730 may be provided, e.g., over an Uu interface in a SIB (such as a new SIB or a modification of an existing SIB). The indication 730 may be provided, e.g., over a PC5 interface. The indication 730 may indicate whether or not the mobile relay is accepting new UEs.

Figure 7B:
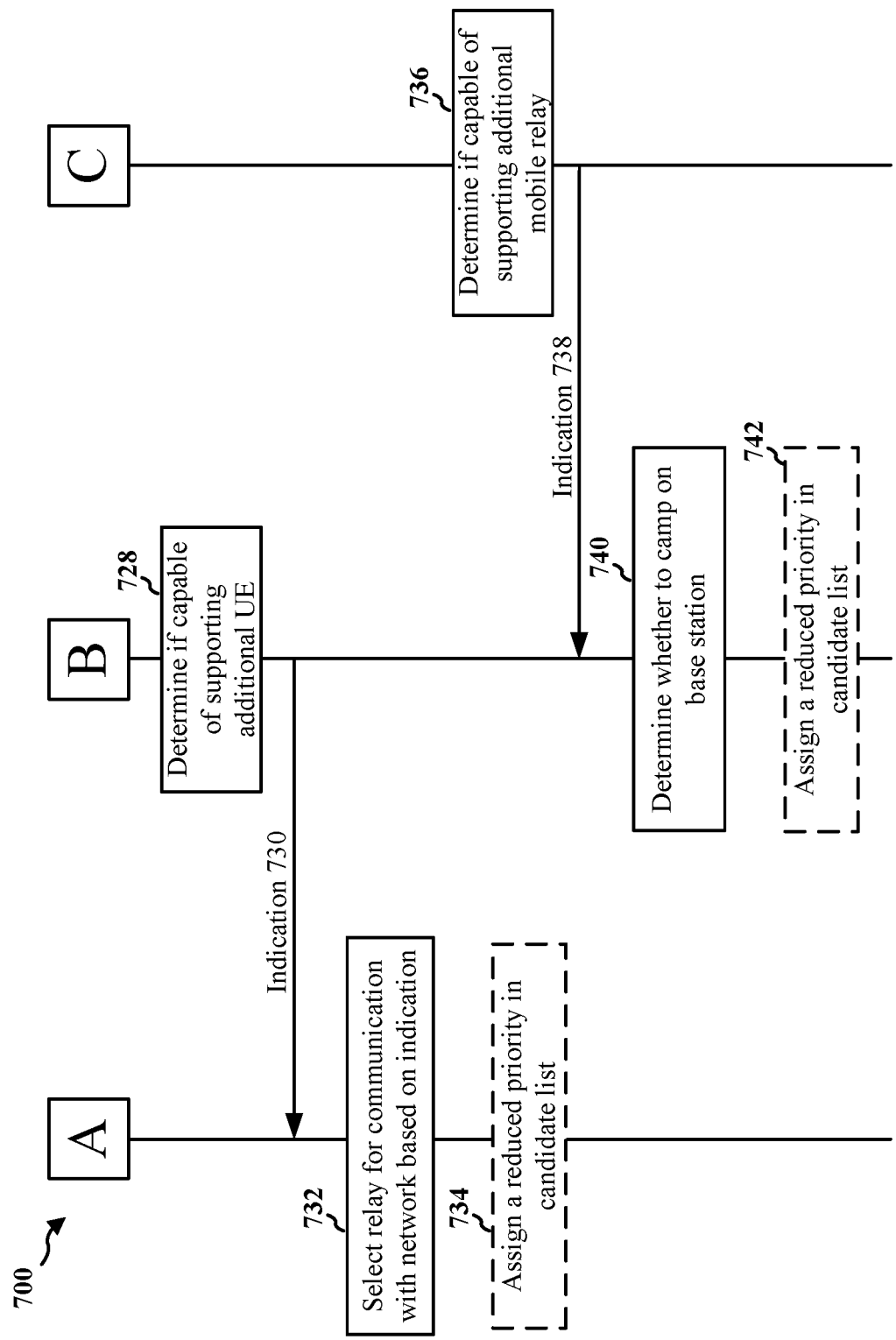
FIG. 7B illustrates a continued call flow diagram from FIG. 7A.

FIG. 7B illustrates an example continued communication flow 700 between the UE, the relay discovery assistance entity 702, and the mobile relay 704. The UE 706 can use the above-described indication from the mobile relay into account when deciding whether to camp on a particular mobile relay, e.g., as illustrated at 732. In some aspects, the UE may place relays that cannot accept new UEs as lowest priority location in the list of candidate relays on which the UE may camp, e.g., as illustrated at 734. In some aspects, the UE may remove the mobile relay from the list of candidate relay when the indication indicates that the mobile relay is not accepting new UEs.

Similarly, a donor base station may broadcast an indication 738 of whether the donor base station can accept new mobile relays. In an example in which the relay discovery assistance entity 702 corresponds to a base station, the base station may determine, at 736, whether the base station is capable of supporting additional mobile relays. Then, the base station may transmit indication 738, e.g., broadcast in system information such as a SIB. The mobile relay 704 may receive the indication 738 and may use information, at 740, when deciding whether to camp on a donor base station. For example, if the indication indicates that the base station is not accepting, or is not capable of accepting, additional mobile relays, the mobile relay may determine not to camp on the base station. The mobile relay be move the base station to a lowest, or lower, priority level on a candidate base station list, as illustrated at 742. In some aspects, the mobile relay may remove the base station from the candidate base station list when the indication indicates that the base station is not accepting new mobile relays.

FIG. 8 is a flowchart 800 of a method of wireless communication. The method may be performed by a network entity or a component of a network entity (e.g., the core network 190 or the base station 102,180, 310, 402, 1850, 2050; the apparatus 1602/1602'; the processing system 1714, which may include the memory 376 and which may be the entire base station 310 or a component of the base station 310, such as the TX processor 316, the RX processor 370, and/or the controller/processor 375). The network entity may correspond to the relay discovery assistance entity 502/602 or the base station 402, as discussed above in connection with FIG. 5 or FIG. 6. According to various aspects, one or more of the illustrated operations of the method 800 may be omitted, transposed, and/or contemporaneously performed. Optional aspects are illustrated with a dashed line. The method may enable a network entity to provide assistance information to at least one UE in an area that identifies at least one mobile relay within the vicinity of the at least one UE.

At 802, the network entity may receive first location information for one or more UEs. For example, 802 may be performed by first location component 1606 of apparatus 1602. In some aspects, for example as shown in FIG. 6, the network entity may receive the location information for the one or more UEs directly form the one or more UEs.

At 804, the network entity may receive second location information for one or more mobile relays. For example, 804 may be performed by second location component 1608 of apparatus 1602. In some aspects, the network entity may receive the first location information for the one or more UEs and the second location information for the one or more mobile relays from another network entity.

At 806, the network entity may determine a distance between the one or more UFs and each of the one or more mobile relays. For example, 806 may be performed by distance component 1610 of apparatus 1602. The network entity may determine the distance between the one or more UEs and each of the one or more mobile relays, based on the first location information received for the one or more UEs, and the second location information received for the one or more mobile relays.

At 808, the network entity may send assistance information to at least one of the one or more UEs in an area. For example, 808 may be performed by assistance information component 1612 of apparatus 1602. The assistance information may identify at least one mobile relay of the one or more mobile relays based on the determined distance between the one or more UEs and the at least one mobile relay. The area in which the one or more UEs is may be the serving cell area of the serving cell. In some aspects, the network entity sends the assistance information to the at least one of the one or more UEs in dedicated signaling for the at least one of the one or more UEs. In some aspects, the dedicated signaling may comprise a RRC message for the at least one of the one or more UEs. In some aspects, the network entity may broadcast the assistance information in system information. The communication for the one or more UEs may be transmitted using a first frequency band, while the assistance information may be transmitted to the at least one of the one or more UEs using a second frequency band. In some aspects, the second frequency band is different than the first frequency band. In some aspects, transmission of the assistance information may not require a high data rate, such that it may be sent in a different frequency band (e.g., second frequency band) having a lower bit rate, in order to save radio resources. In some aspects, the assistance information may include a temporarily restricted list of mobile relays. For example, the network entity may restrict the list of mobile relays provided and indicate that the at least one of the one or more UEs is only allowed to camp on the restricted list of mobile relays. The network entity providing a restricted list of mobile relays may minimize the number of reselections performed by the at least one of the one or more UEs.

In some aspects, for example, at 810, the network entity may receive a request from a UE. For example, 810 may be performed by reception component 1604 of apparatus 1602. In some aspects, the assistance information may be sent to the UE in response to the request from the UE. In some aspects, the assistance information may be sent to the UE via on-demand SIB, in response to the request from the UE. The assistance information may be customized to the UE which has submitted the request to the network entity. The network entity, in some aspects, may correspond to the relay discovery assistance entity 502 of FIG. 5 or the relay discovery assistance entity 602 of FIG. 6. In some aspects, the network entity may correspond to the base station 402, as discussed above in FIG. 5.

Figure 9:
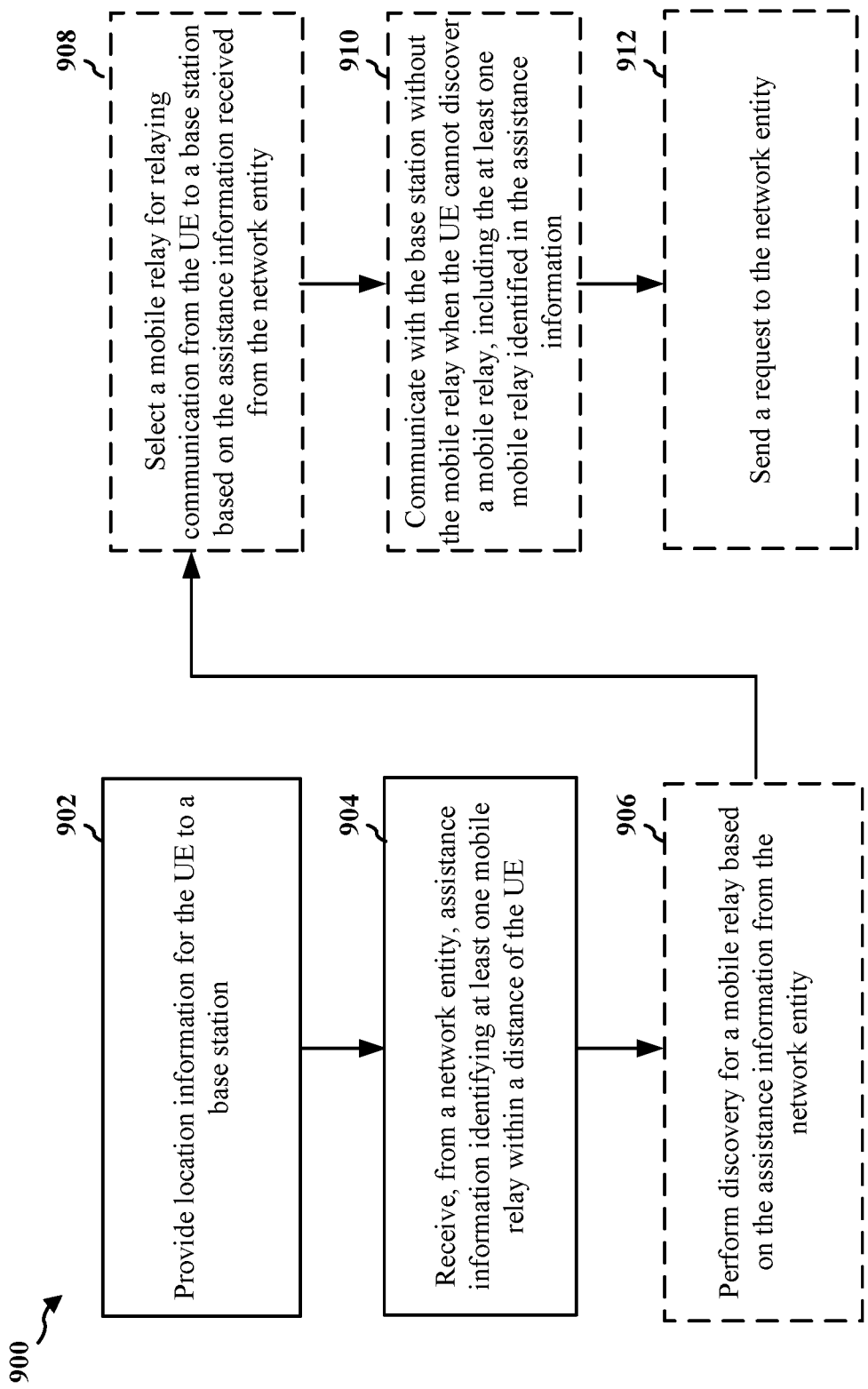
FIG. 9 is a flowchart of a method of wireless communication.

FIG. 9 is a flowchart 900 of a method of wireless communication. The method may be performed by a UE or a component of a UE (e.g., the UE 104, 350, 406, 706, 1660, 2060; the apparatus 1802/1802'; the processing system 1914, which may include the memory 360 and which may be the entire UE 350 or a component of the UE 350, such as the TX processor 368, the RX processor 356, and/or the controller/processor 359). According to various aspects, one or more of the illustrated operations of the method 900 may be omitted, transposed, and/or contemporaneously performed. Optional aspects are illustrated with a dashed line. The method may enable a UE to discover a mobile relay within the vicinity of the UE based on assistance information provided by a network entity.

At 902, the UE may provide location information to a base station. For example, 902 may be performed by location component 1806 of apparatus 1802. The location information provided to the base station may be related to the UE.

At 904, the UE may receive, from a network entity, assistance information that may identify at least one mobile relay within a distance of the UE. For example, 904 may be performed by assistance information component 1808 of apparatus 1802. In some aspects, the UE may provide the location information for the UE to the network entity. While in some aspects, the UE may provide the location information for the UE to another network entity. The UE may receive the assistance information from the network entity in dedicated signaling for the UE. In some aspects, the dedicated signaling may comprise a RRC message for the UE. In some aspects, the UE may receive the assistance information in broadcast system information. In some aspects, the UE may receive data using a first frequency band, such that the UE receives the assistance information using a second frequency band. The second frequency band may be different than the first frequency band. In some aspects, transmission of the assistance information may not require a high data rate, such that it may be sent in a different frequency band (e.g., second frequency band) having a lower bit rate, in order to save radio resources. In some aspects, the assistance information may include a restricted list of mobile relays. The restricted list of mobile relays may indicate that the UE is only allowed to camp on the restricted list of mobile relays. The network entity providing the restricted list of mobile relays may minimize the number of reselections performed by the UE.

In some aspects, for example, at 906, the UE may perform discovery for a mobile relay. For example, 906 may be performed by discovery component 1810 of apparatus 1802. The UE may perform discovery for the mobile relay based on the assistance information provided from the network entity.

In some aspects, for example, at 908, the UE may select a mobile relay for relaying communication from the UE to a base station. For example, 908 may be performed by selection component 1812 of apparatus 1802. The UE may select the mobile relay for relaying communication from the UE to the base station based on the assistance information received from the network entity. In some aspects, the UE selecting the mobile relay may allow the UE to handover from one mobile relay to another.

In some aspects, for example, at 910, the UE may communicate with the base station without the mobile relay when the UE is unable to discover the mobile relay, including the at least one mobile relay identified in the assistance information. For example, 910 may be performed by communication component 1814 of apparatus 1802. The UE communicating with the base station without the mobile relay may assist in having the UE avoid entering an out-of-service state or experiencing radio link failure, such that the UE may fallback or revert to communicating with the base station.

In some aspects, for example, at 912, the UE may send a request to the network entity. For example, 912 may be performed by request component 1816 of apparatus 1802. The UE may receive the assistance information in response to the request sent to the network entity. In some aspects, the assistance information may be provided via on-demand SIB, in response to the request from the UE. The assistance information may be customized to the UE which has submitted the request to the network entity. The network entity, in some aspects, may correspond to the relay discovery assistance entity 502 of FIG. 5 or the relay discovery assistance entity 602 of FIG. 6. In some aspects, the network entity may correspond to the base station 402, as discussed above in FIG. 5.

Figure 10:
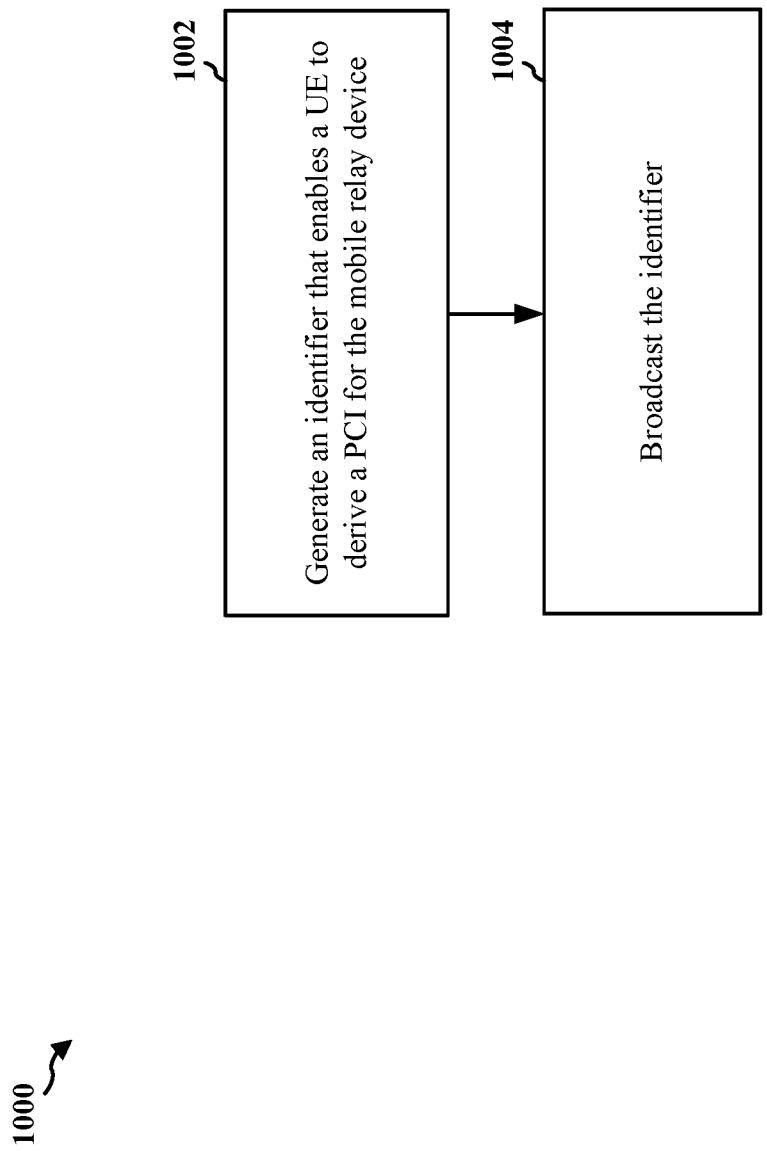
FIG. 10 is a flowchart of a method of wireless communication.

FIG. 10 is a flowchart 1000 of a method of wireless communication. The method may be performed by a relay device (e.g., 107, 404, 704, 1650, 1860; the apparatus 2002/2002'; the processing system 2114). According to various aspects, one or more of the illustrated operations of the method 1000 may be omitted, transposed, and/or contemporaneously performed. The method may enable a relay device to generate an identifier that allows a UE to derive the physical cell identity (PCI) for the relay device.

At 1002, the relay device may generate an identifier. For example, 1002 may be performed by identifier component 2006 of apparatus 2002. The identifier may enable a UE to derive the PCI for the relay device. The relay device may correspond to the mobile relay 404.

At 1004, the relay device may broadcast the identifier. For example, 1004 may be performed by transmission component 2016 of apparatus 2002. In some aspects, the relay device may broadcast the identifier using device-to-device communication (e.g., PC5). PC5 is one example of device-to-device communication, whereby device-to-device communication occurs via the PC5 interface, and the disclosure is not intended to be limited to the aspects disclosed herein. In some aspects, the identifier may be a short identifier (e.g., 2-3 bytes) that is broadcast using device-to-device communication. The short identifier may be longer or shorter than 2-3 bytes, and is not intended to be limited to the aspects disclosed herein. The UE may utilize the short identifier to deduce the PCI of the relay.

Figure 11:
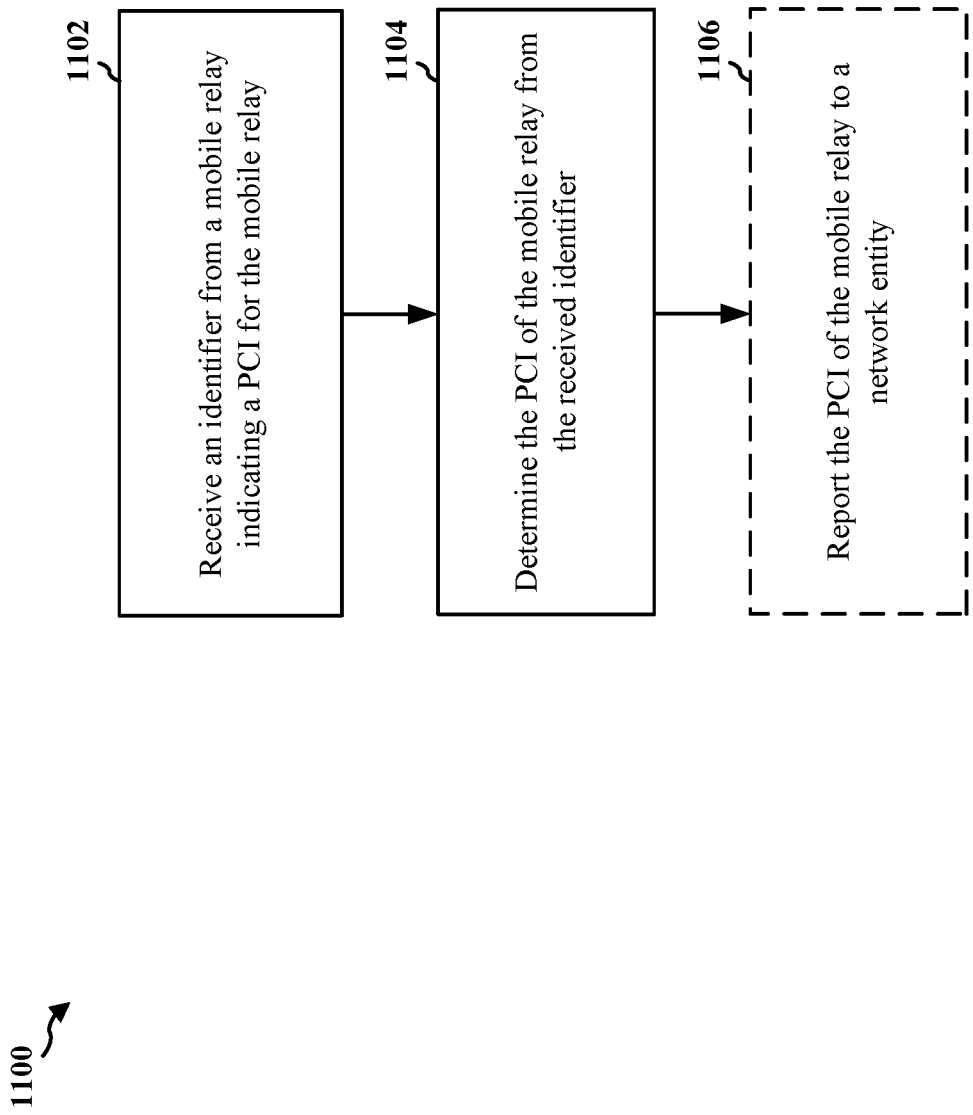
FIG. 11 is a flowchart of a method of wireless communication.

FIG. 11 is a flowchart 1100 of a method of wireless communication. The method may be performed by a UE or a component of a UE (e.g., the UE 104, 350, 406, 706, 1660, 2060; the apparatus 1802/1802'; the processing system 1914, which may include the memory 360 and which may be the entire UE 350 or a component of the UE 350, such as the TX processor 368, the RX processor 356, and/or the controller/processor 359). According to various aspects, one or more of the illustrated operations of the method 1100 may be omitted, transposed, and/or contemporaneously performed. The method may enable a UE to determine the PCI of a mobile relay.

At 1102, the UE may receive an identifier from a mobile relay. For example, 1102 may be performed by identifier component 1818 of apparatus 1802. The identifier from the mobile relay may indicate a PCI for the mobile relay.

At 1104, the UE may determine the PCI of the mobile relay from the received identifier. For example, 1104 may be performed by PCI component 1820 of apparatus 1802. In some aspects, the UE may receive the identifier in a broadcast from the mobile relay. For example, the broadcast from the mobile relay may be based on PC5 communication. In some aspects, the identifier may be a short identifier (e.g., 2-3 bytes) that is broadcast using device-to-device communication (e.g., PC5 communication). The short identifier may be longer or shorter than 2-3 bytes, and is not intended to be limited to the aspects disclosed herein. The UE may utilize the short identifier to deduce the PCI of the mobile relay.

In some aspects, for example, at 1106, the UE may report the PCI of the mobile relay to a network entity. For example, 1106 may be performed by report component 1822 of apparatus 1802. The UE may report the PCI of the mobile relay to the network entity in order to assist a donor base station to maintain or update a list of neighboring relays. In some aspects, the network entity may comprise the base station or another network entity.

Figure 12:
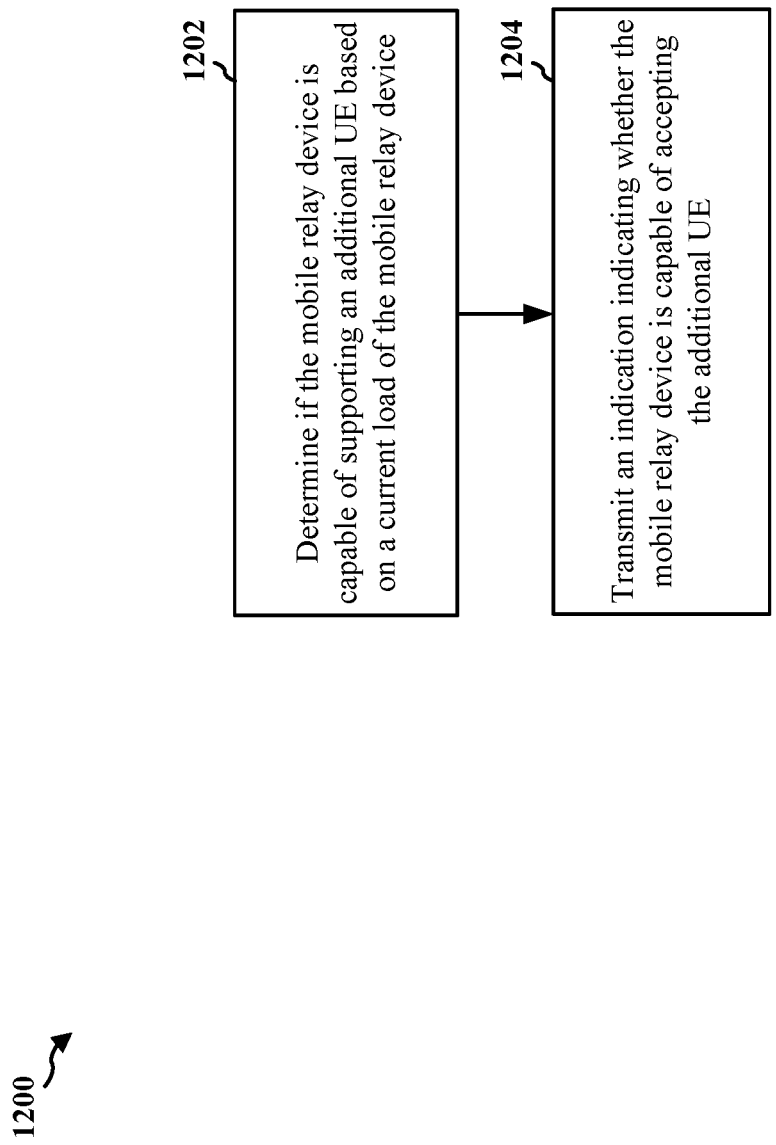
FIG. 12 is a flowchart of a method of wireless communication.

FIG. 12 is a flowchart 1200 of a method of wireless communication. The method may be performed by a relay device (e.g., 107, 404, 704, 1650, 1860; the apparatus 2002/2002'; the processing system 2114). According to various aspects, one or more of the illustrated operations of the method 1200 may be omitted, transposed, and/or contemporaneously performed. The method may enable a mobile relay device to indicate whether the additional UEs may be supported.

At 1202, the mobile relay device may determine if the mobile relay device is capable of supporting an additional UE. For example, 1202 may be performed by determination component 2008 of apparatus 2002. The mobile relay device may determine if the mobile relay device is capable of supporting the additional UE based on a current load of the mobile relay device. For example, the mobile relay device may not have sufficient available resources to support the additional UE.

At 1204, the mobile relay device may transmit an indication indicating whether the mobile relay device is capable of accepting the additional UE. For example, 1204 may be performed by transmission component 2016 of apparatus 2002. In some aspects, the mobile relay device may broadcast the indication. The mobile relay device may broadcast the indication as system information using an Uu interface. In some aspects, the mobile relay device may broadcast the indication using device-to-device communication (e.g., PC5).

Figure 13:
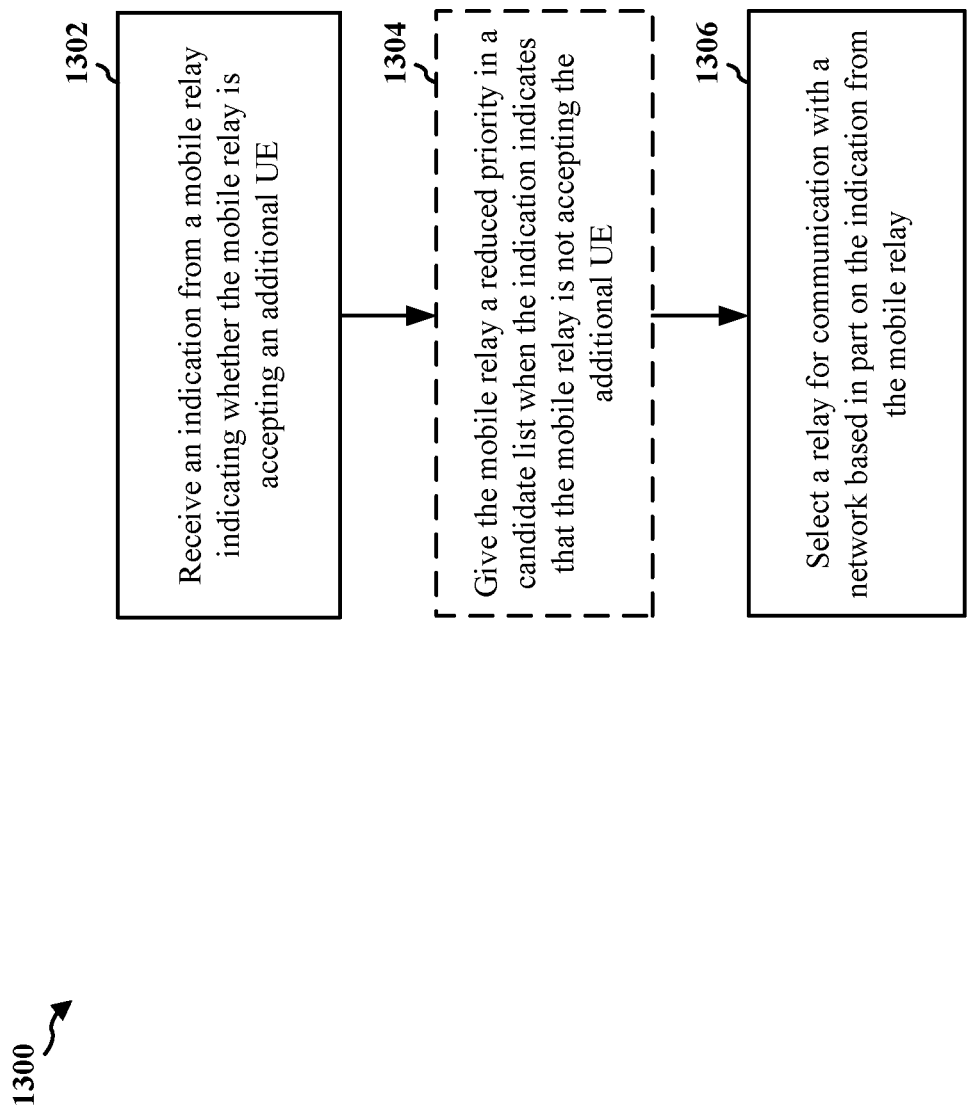
FIG. 13 is a flowchart of a method of wireless communication.

FIG. 13 is a flowchart 1300 of a method of wireless communication. The method may be performed by a UE or a component of a UE (e.g., the UE 104, 350, 406, 706, 1660, 2060; the apparatus 1802/1802'; the processing system 1914, which may include the memory 360 and which may be the entire UE 350 or a component of the UE 350, such as the TX processor 368, the RX processor 356, and/or the controller/processor 359). According to various aspects, one or more of the illustrated operations of the method 1300 may be omitted, transposed, and/or contemporaneously performed. The method may enable a UE to select a relay based on the current load of the relay.

At 1302, the UE may receive an indication from a mobile relay indicating whether the mobile relay is accepting an additional UE. For example, 1302 may be performed by indication component 1824 of apparatus 1802. In some aspects, the UE may receive the indication in a broadcast from the mobile relay. The UE may receive the indication as system information based on a Uu interface. In some aspects, the UE may receive the indication as system information based on device-to-device communication (e.g., PC5).

In some aspects, for example, at 1304, the UE may assign the mobile relay a reduced priority in a candidate list when the indication indicates that the mobile relay is not accepting the additional UE. For example, 1304 may be performed by priority component 1828 of apparatus 1802. In some aspects, the UE may remove the mobile relay from the list of candidate relays when the indication indicates that the mobile relay is not accepting new UEs. In some aspects, the UE may account for the information within the indication when deciding which relay to select, and may assign or give mobile relays a lower or lowest priority in the candidate list on which the UE may camp on, when mobile relays indicate that they cannot accept additional UEs.

At 1306, the UE may select a relay for communication with a network. For example, 1306 may be performed by relay component 1826 of apparatus 1802. The UE may select the relay for communication with the network based, in part, on the indication from the mobile relay.

Figure 14:
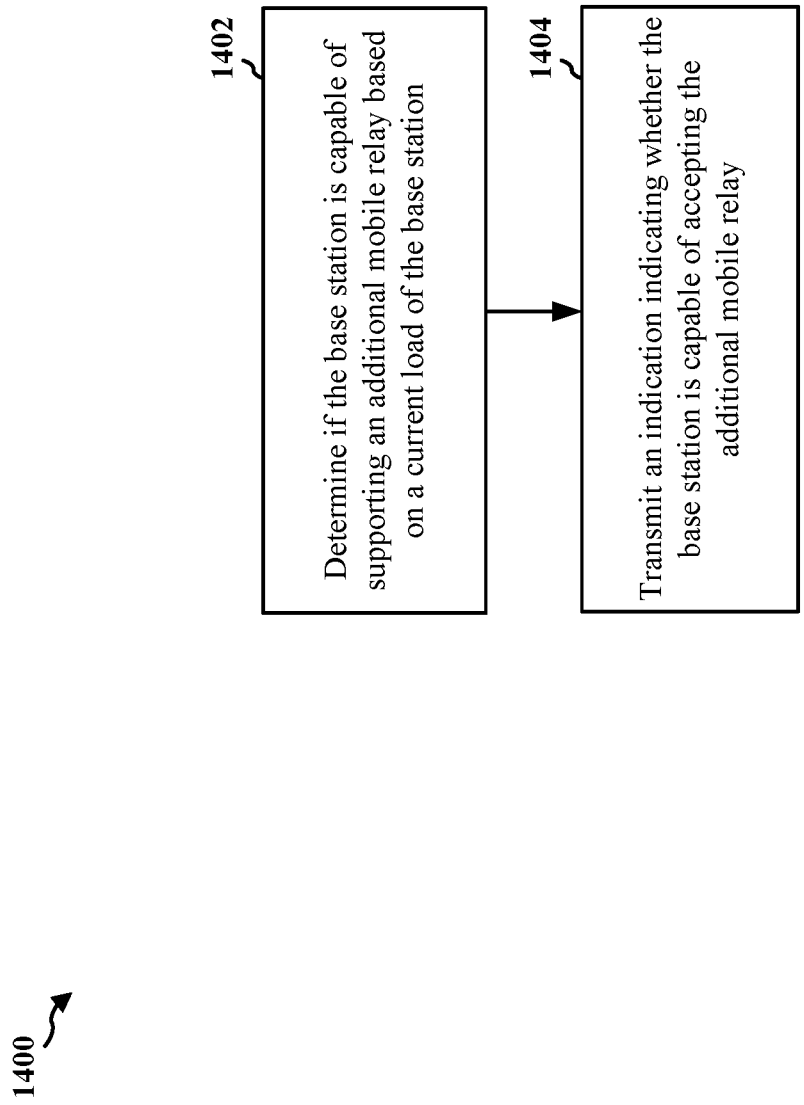
FIG. 14 is a flowchart of a method of wireless communication.

FIG. 14 is a flowchart 1400 of a method of wireless communication. The method may be performed by a base station or a component of a base station (e.g., the base station 102, 180, 310, 402, 1850, 2050; the apparatus 1602/1602'; the processing system 1714, which may include the memory 376 and which may be the entire base station 310 or a component of the base station 310, such as the TX processor 316, the RX processor 370, and/or the controller/processor 375). According to various aspects, one or more of the illustrated operations of the method 1400 may be omitted, transposed, and/or contemporaneously performed. The method may enable a base station to indicate whether the base station may support an additional mobile relay based on the current load of the base station.

At 1402, the base station may determine if the base station is capable of supporting an additional mobile relay. For example, 1402 may be performed by determination component 1614 of apparatus 1602. The base station may determine if the base station is capable of supporting the additional mobile relay based on a current load of the base station.

At 1404, the base station may transmit an indication whether the base station is capable of accepting the additional mobile relay. For example, 1404 may be performed by transmission component 1616 of apparatus 1602. In some aspects, the base station may broadcast the indication. For example, the base station may broadcast the indication in system information. A base station that is configured to accept mobile relays may be known as a donor base station. In response to transmitting the indication as to whether the base station is capable of accepting the additional mobile relay, the mobile relay may take the indication into account when deciding whether to camp on the base station.

Figure 15:
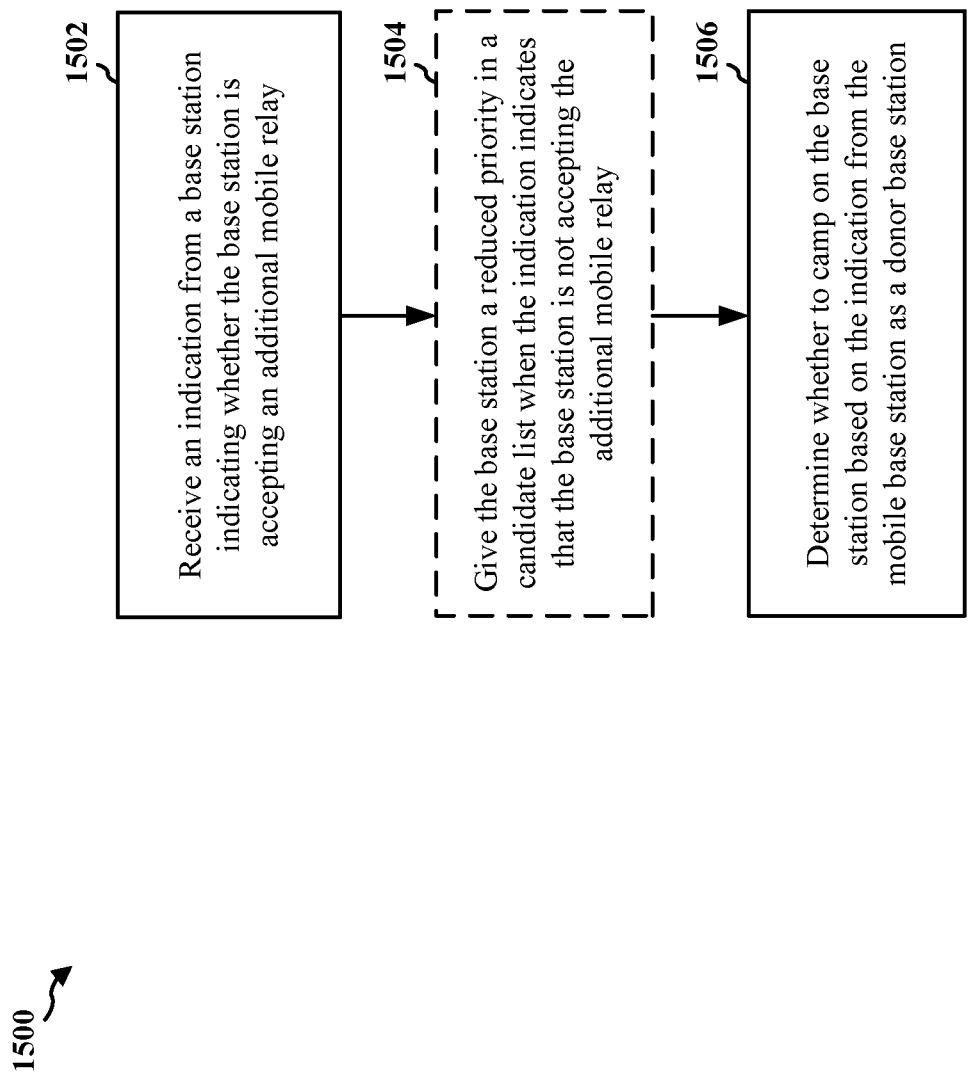
FIG. 15 is a flowchart of a method of wireless communication.

FIG. 15 is a flowchart 1500 of a method of wireless communication. The method may be performed by a relay device (e.g., 107, 404, 704, 1650, 1860; the apparatus 2002/2002'; the processing system 2114). According to various aspects, one or more of the illustrated operations of the method 1500 may be omitted, transposed, and/or contemporaneously performed. Optional aspects are illustrated with a dashed line. The method may enable a mobile relay device to determine whether or not to camp on a base station.

At 1502, the mobile relay device may receive an indication from a base station indicating whether the base station is accepting an additional mobile relay. For example, 1502 may be performed by indication component 2010 of apparatus 2002. In some aspects, the mobile relay device may receive the indication as system information broadcast from the base station.

In some aspects, for example, at 1504, the mobile relay device may give the base station a reduced priority in a candidate list when the indication indicates that the base station is not accepting the additional mobile relay. For example, 1504 may be performed by priority component 2014 of apparatus 2002. In some aspects, the mobile relay device may remove the base station from the list of candidate base stations when the indication indicates that the base station is not accepting new mobile relay devices. In some aspects, the mobile relay device may account for the information within the indication when deciding whether to camp on the base station, and may assign base stations that cannot accept additional mobile relays a lower or lowest priority in the candidate list.

At 1506, the mobile relay device may determine whether to camp on the base station. For example, 1506 may be performed by camp component 2012 of apparatus 2002. The mobile relay device may determine whether to camp on the base station based on the indication from the base station. A base station that is capable of accepting mobile relays may be known as a donor base station.

Figure 16:
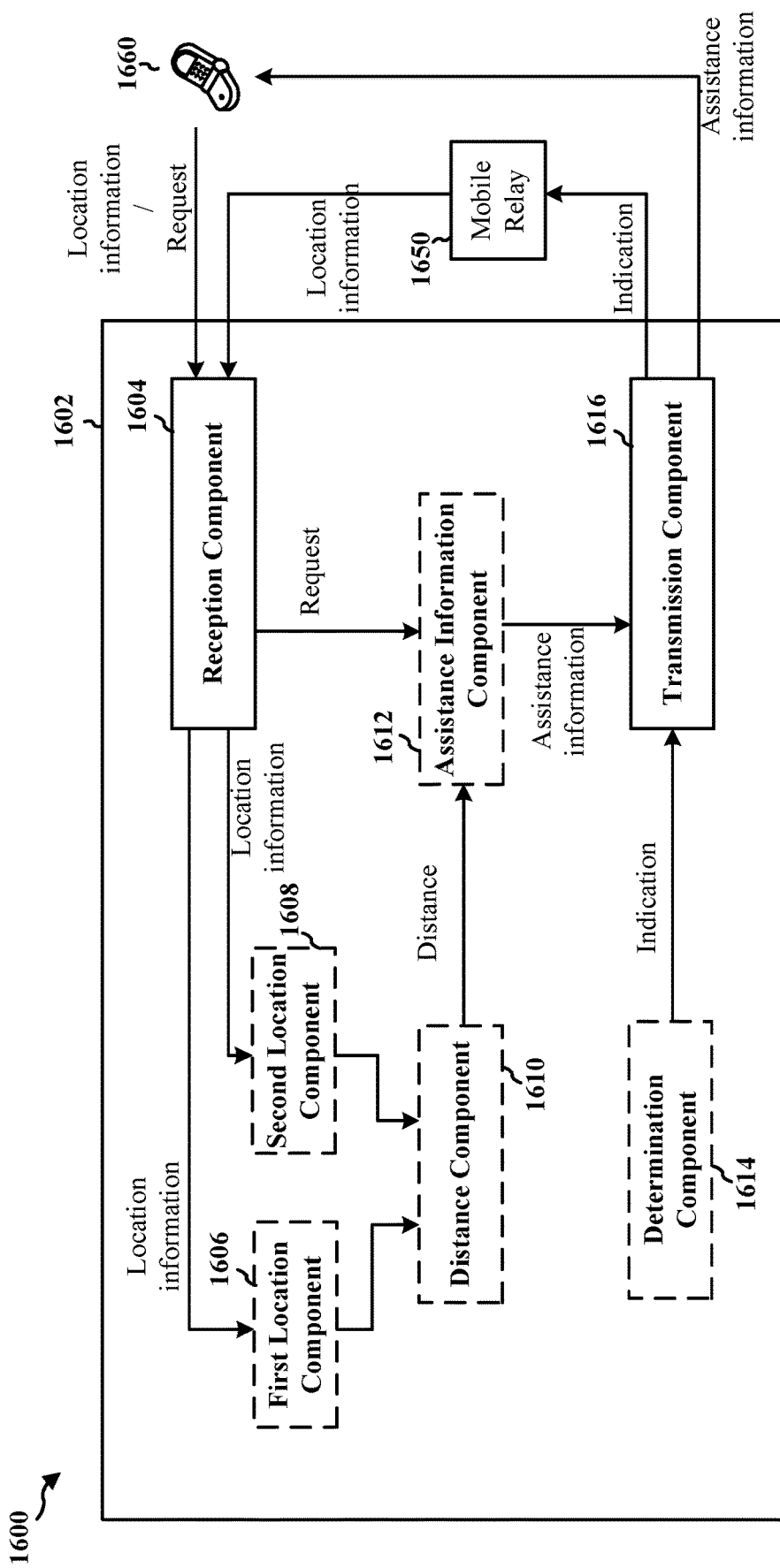
FIG. 16 is a conceptual data flow diagram illustrating the data flow between different means/components in an example apparatus.

FIG. 16 is a conceptual data flow diagram 1600 illustrating the data flow between different means/components in an example apparatus 1602. The apparatus may be a network entity or a component of a network entity. The apparatus includes a reception component 1604 that may be configured to receive various types of signals/messages and/or other information from other devices, including, for example, the mobile relay 1650 or the UE 1660. The apparatus includes a first location component 1606 that may receive first location information for one or more UEs, e.g., as described in connection with 802 of FIG. 8. The apparatus includes a second location component 1608 that may receive second location information for one or more mobile relays, e.g., as described in connection with 804 of FIG. 8. The apparatus includes a distance component 1610 that may determine a distance between the one or more UEs and each of the one or more mobile relays, e.g., as described in connection with 806 of FIG. 8. The apparatus includes an assistance information component 1612 that may send assistance information to at least one of the one or more UEs in an area, e.g., as described in connection with 808 of FIG. 8. The apparatus includes a determination component 1614 that may determine if the base station is capable of supporting an additional mobile relay, e.g., as described in connection with 1402 of FIG. 14. The apparatus includes a transmission component 1616 that may be configured to transmit various types of signals/messages and/or other information to other devices, including, for example, the mobile relay 1650 or the UE 1660. The transmission component 1616 may transmit an indication whether the base station is capable of accepting the additional mobile relay, e.g., as described in connection with 1404 of FIG. 14.

The apparatus may include additional components that perform each of the blocks of the algorithm in the aforementioned flowcharts of FIGS. 8 and 14. As such, each block in the aforementioned flowcharts of FIGS. 8 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
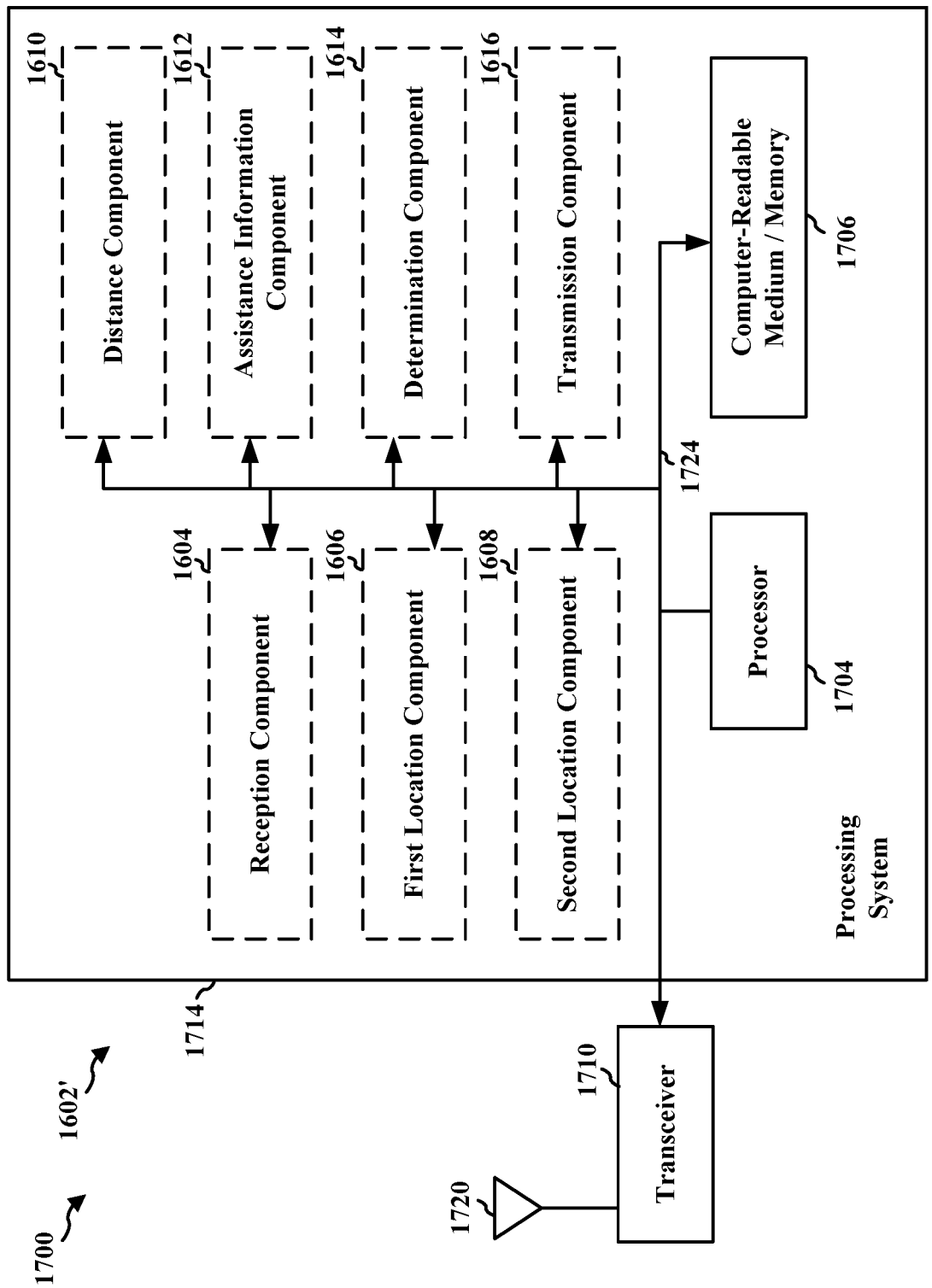
FIG. 17 is a diagram illustrating an example of a hardware implementation for an apparatus employing a processing system.

FIG. 17 is a diagram 1700 illustrating an example of hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610, 1612, 1614, 1616, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1616, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610, 1612, 1614, 1616. The components may be software components running in the processor 1704, resident/stored in the computer readable medium/memory 1706, one or more hardware components coupled to the processor 1704, or some combination thereof. The processing system 1714 may be a component of the base station 310 and may include the memory 376 and/or at least one of the TX processor 316, the RX processor 370, and the controller/processor 375. Alternatively, the processing system 1714 may be the entire base station (e.g., see 310 of FIG. 3).

In one configuration, the apparatus 1602/1602' for wireless communication includes means for means for receiving first location information for one or more UEs. The apparatus includes means for receiving second location information for one or more mobile relays. The apparatus includes means for determining a distance between the one or more UEs and each of the one or more mobile relays. The apparatus includes means for sending assistance information to at least one of the one or more UEs in an area. The assistance information identifying at least one mobile relay of the one or more mobile relays based on the determined distance between the one or more UEs and the at least one mobile relay. The apparatus may further include means for receiving a request from a UE, wherein the assistance information is sent to the UE in response to the request from the UE. The apparatus includes means for determining if the base station is capable of supporting an additional mobile relay based on a current load of the base station. The apparatus includes means for transmitting an indication indicating whether the base station is capable of accepting the additional mobile relay. The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 18:
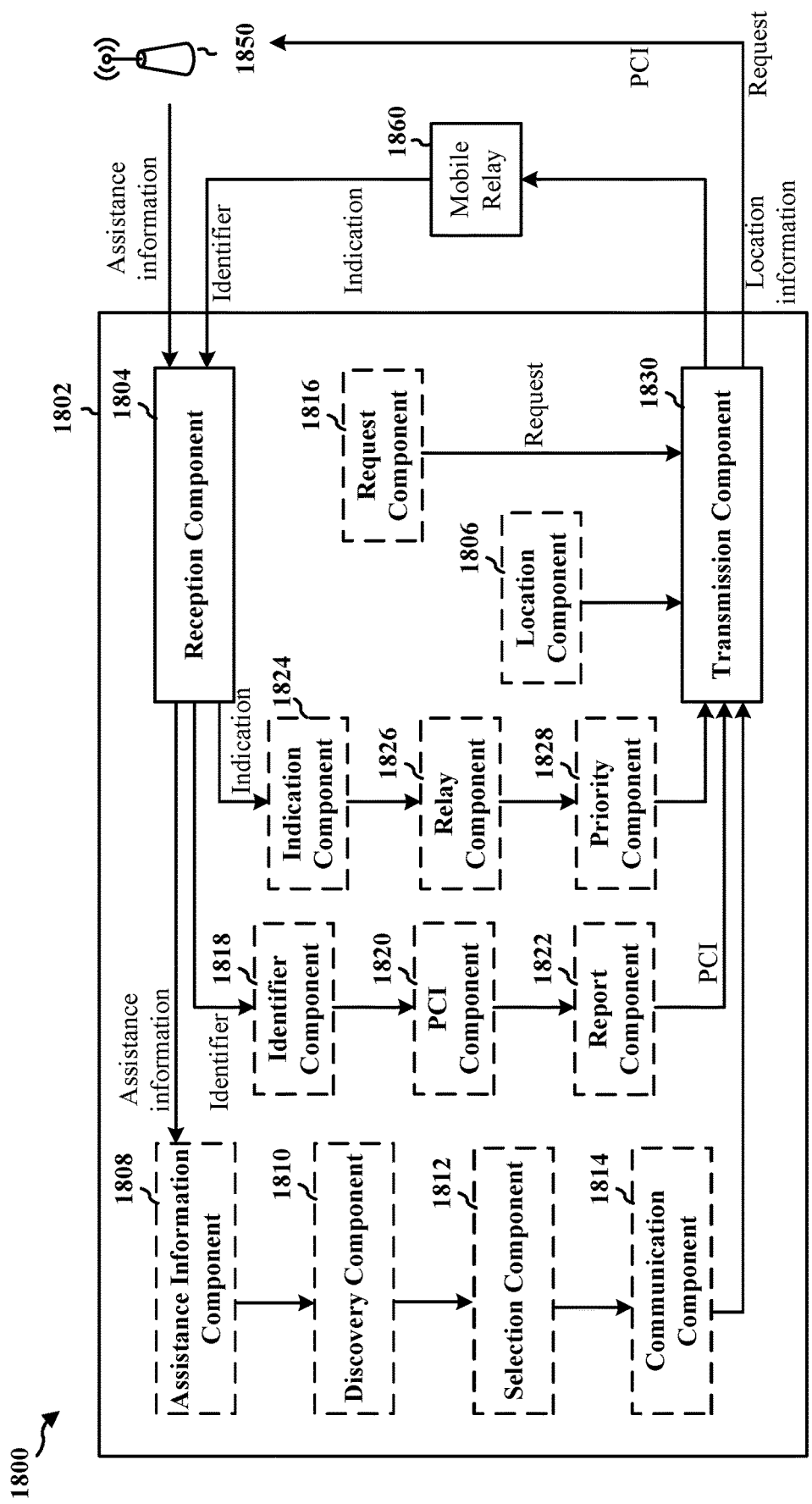
FIG. 18 is a conceptual data flow diagram illustrating the data flow between different means/components in an example apparatus.

FIG. 18 is a conceptual data flow diagram 1800 illustrating the data flow between different means/components in an example apparatus 1802. The apparatus may be a UE or a component of a UE. The apparatus includes a reception component 1804 that may be configured to receive various types of signals/messages and/or other information from other devices, including, for example, the base station 1850 or the mobile relay 1860. The apparatus includes a location component 1806 that may provide location information to a base station, e.g., as described in connection with 902 of FIG. 9. The apparatus includes an assistance information component 1808 that may receive, from a network entity, assistance information that may identify at least one mobile relay within a distance of the UE, e.g., as described in connection with 904 of FIG. 9. The apparatus includes a discovery component 1810 that may perform discovery for a mobile relay, e.g., as described in connection with 906 of FIG. 9. The apparatus includes a selection component 1812 that may select a mobile relay for relaying communication from the UE to a base station, e.g., as described in connection with 908 of FIG. 9. The apparatus includes a communication component 1814 that may communicate with the base station without the mobile relay when the UE is unable to discover the mobile relay, e.g., as described in connection with 910 of FIG. 9. The apparatus includes a request component 1816 that may send a request to the network entity, e.g., as described in connection with 912 of FIG. 9. The apparatus includes an identifier component 1818 that may receive an identifier from a mobile relay, e.g., as described in connection with 1102 of FIG. 11. The apparatus includes a PCI component 1820 that may determine the PCI of the mobile relay from the received identifier, e.g., as described in connection with 1104 of FIG. 11. The apparatus includes a report component 1822 that may report the PCI of the mobile relay to a network entity, e.g., as described in connection with 1106 of FIG. 11. The apparatus includes an indication component 1824 that may receive an indication from a mobile relay indicating whether the mobile relay is accepting an additional UE, e.g., as described in connection with 1302 of FIG. 13. The apparatus includes a relay component 1826 that may select a relay for communication with a network, e.g., as described in connection with 1306 of FIG. 13. The apparatus includes a priority component 1828 that may assign the mobile relay a reduced priority in a candidate list when the indication indicates that the mobile relay is not accepting the additional UE, e.g., as described in connection with 1304 of FIG. 13.

The apparatus may include additional components that perform each of the blocks of the algorithm in the aforementioned flowcharts of FIGS. 9, 11, and 13. As such, each block in the aforementioned flowcharts of FIGS. 9, 11, and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 19:
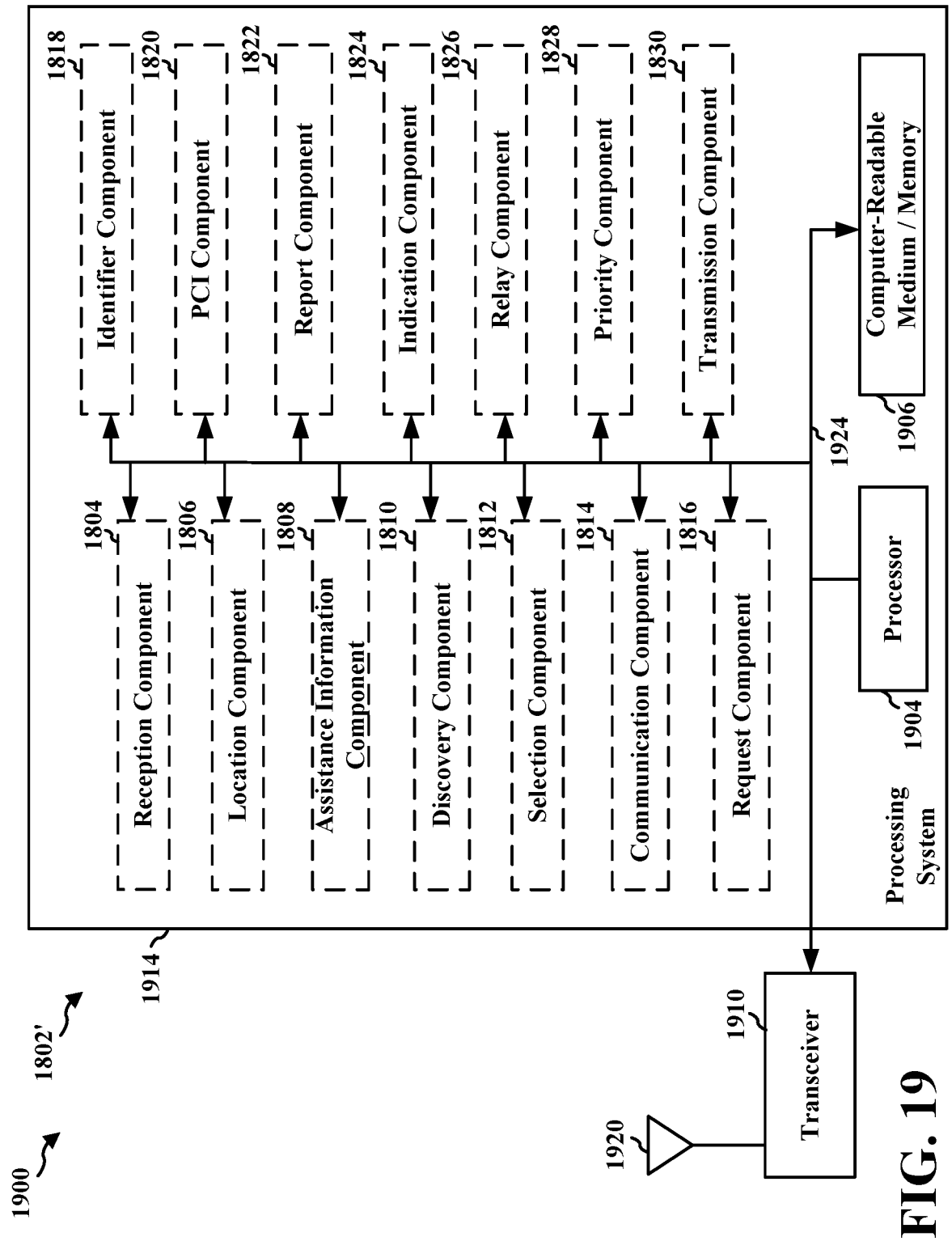
FIG. 19 is a diagram illustrating an example of a hardware implementation for an apparatus employing a processing system.

FIG. 19 is a diagram 1900 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware components, represented by the processor 1904, the components 1804, 1806, 1808, 1810, 1812, 1814, 1816, 1818, 1820, 1822, 1824, 1826, 1828, 1830, and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1804. In addition, the transceiver 1910 receives information from the processing system 1914, specifically the transmission component 1830, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system 1914 further includes at least one of the components 1804, 1806, 1808, 1810, 1812, 1814, 1816, 1818, 1820, 1822, 1824, 1826, 1828, 1830. The components may be software components running in the processor 1904, resident/stored in the computer readable medium/memory 1906, one or more hardware components coupled to the processor 1904, or some combination thereof. The processing system 1914 may be a component of the UE 350 and may include the memory 360 and/or at least one of the TX processor 368, the RX processor 356, and the controller/processor 359. Alternatively, the processing system 1914 may be the entire UE (e.g., see 350 of FIG. 3).

In one configuration, the apparatus 1802/1802' for wireless communication includes means for providing location information for the UE to a base station. The apparatus includes means for receiving, from a network entity, assistance information identifying at least one mobile relay within a distance of the UE. The apparatus further includes means for performing discovery for a mobile relay based on the assistance information provided from the network entity. The apparatus further includes means for selecting a mobile relay for relaying communication from the UE to a base station based on the assistance information received from the network entity. The apparatus further includes means for communicating with the base station without the mobile relay when the UE cannot discover a mobile relay, including the at least one mobile relay identified in the assistance information. The apparatus further includes means for sending a request to the network entity, wherein the UE receives the assistance information in response to the request. The apparatus includes means for receiving an identifier from a mobile relay indicating a PCI for the mobile relay. The apparatus includes means for determining the PCI of the mobile relay from the received identifier. The apparatus includes means for receiving an indication from a mobile relay indicating whether the mobile relay is accepting an additional UE. The apparatus includes means for selecting a relay for communication with a network based in part on the indication from the mobile relay. The apparatus further includes means for giving the mobile relay a reduced priority in a candidate list or removing the mobile relay from the candidate list when the indication indicates that the mobile relay is not accepting the additional UE. The aforementioned means may be one or more of the aforementioned components of the apparatus 1802 and/or the processing system 1914 of the apparatus 1802' configured to perform the functions recited by the aforementioned means. As described supra, the processing system 1914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 20:
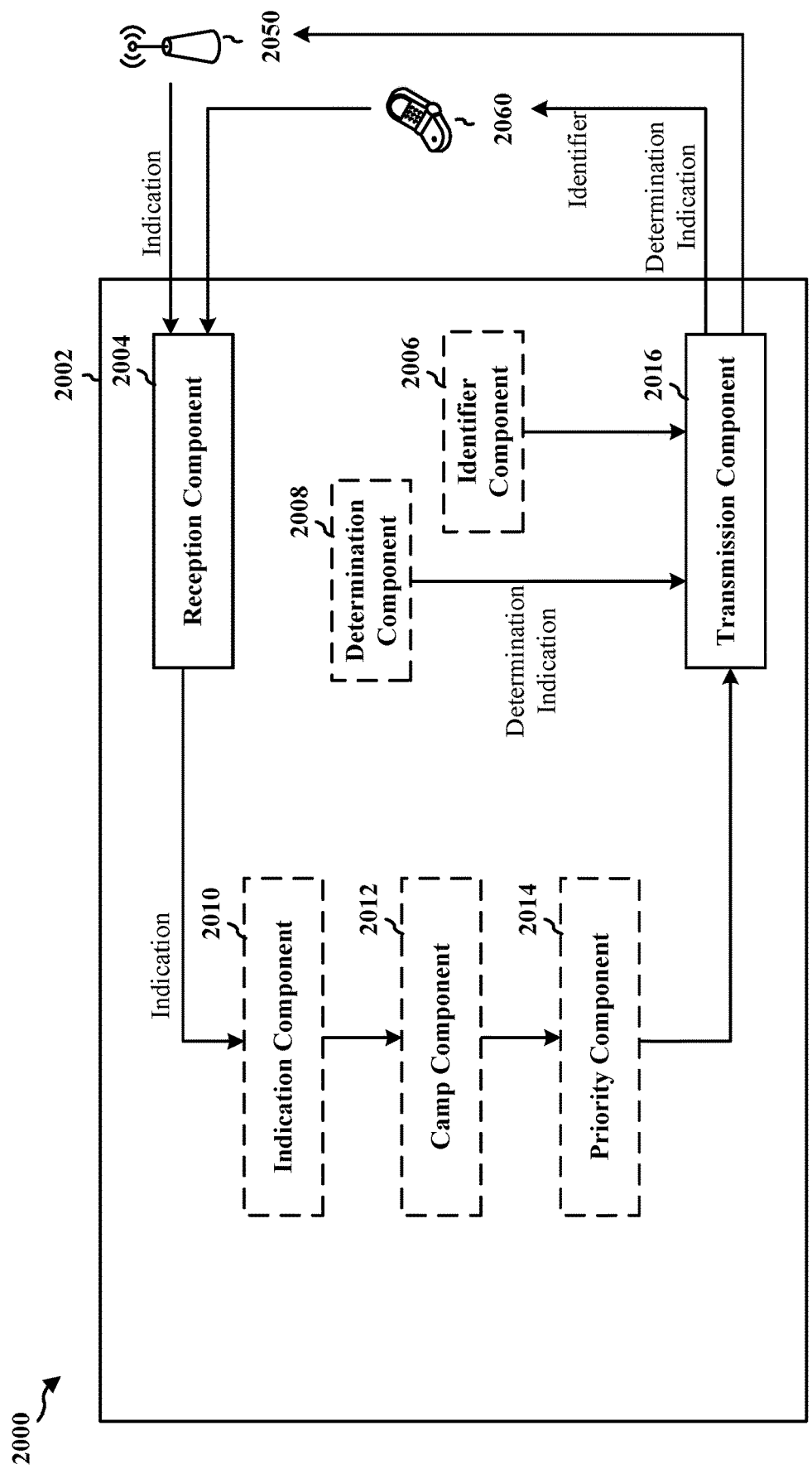
FIG. 20 is a conceptual data flow diagram illustrating the data flow between different means/components in an example apparatus.

FIG. 20 is a conceptual data flow diagram 2000 illustrating the data flow between different means/components in an example apparatus 2002. The apparatus may be a mobile relay or a component of a mobile relay. The apparatus includes a reception component 2004 that may be configured to receive various types of signals/messages and/or other information from other devices, including, for example, the base station 2050 or the UE 2060. The apparatus includes an identifier component 2006 that may generate an identifier, e.g., as described in connection with 1002 of FIG. 10. The apparatus includes a determination component 2008 that may determine if the mobile relay device is capable of supporting an additional UE, e.g., as described in connection with 1202 of FIG. 12. The apparatus includes an indication component 2010 that may receive an indication from a base station indicating whether the base station is accepting an additional mobile relay, e.g., as described in connection with 1502 of FIG. 15. The apparatus includes a camp component 2012 that may determine whether to camp on the base station, e.g., as described in connection with 1506 of FIG. 15. The apparatus includes a priority component 2014 that may give the base station a reduced priority in a candidate list when the indication indicates that the base station is not accepting the additional mobile relay, e.g., as described in connection with 1504 of FIG. 15. The apparatus includes a transmission component 2016 that may broadcast the identifier, e.g., as described in connection with 1004 of FIG. 10. The transmission component 2016 may transmit an indication indicating whether the mobile relay device is capable of accepting the additional UE, e.g., as described in connection with 1204 of FIG. 12.

The apparatus may include additional components that perform each of the blocks of the algorithm in the aforementioned flowcharts of FIGS. 10, 12, and 15. As such, each block in the aforementioned flowcharts of FIGS. 10, 12, and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 21:
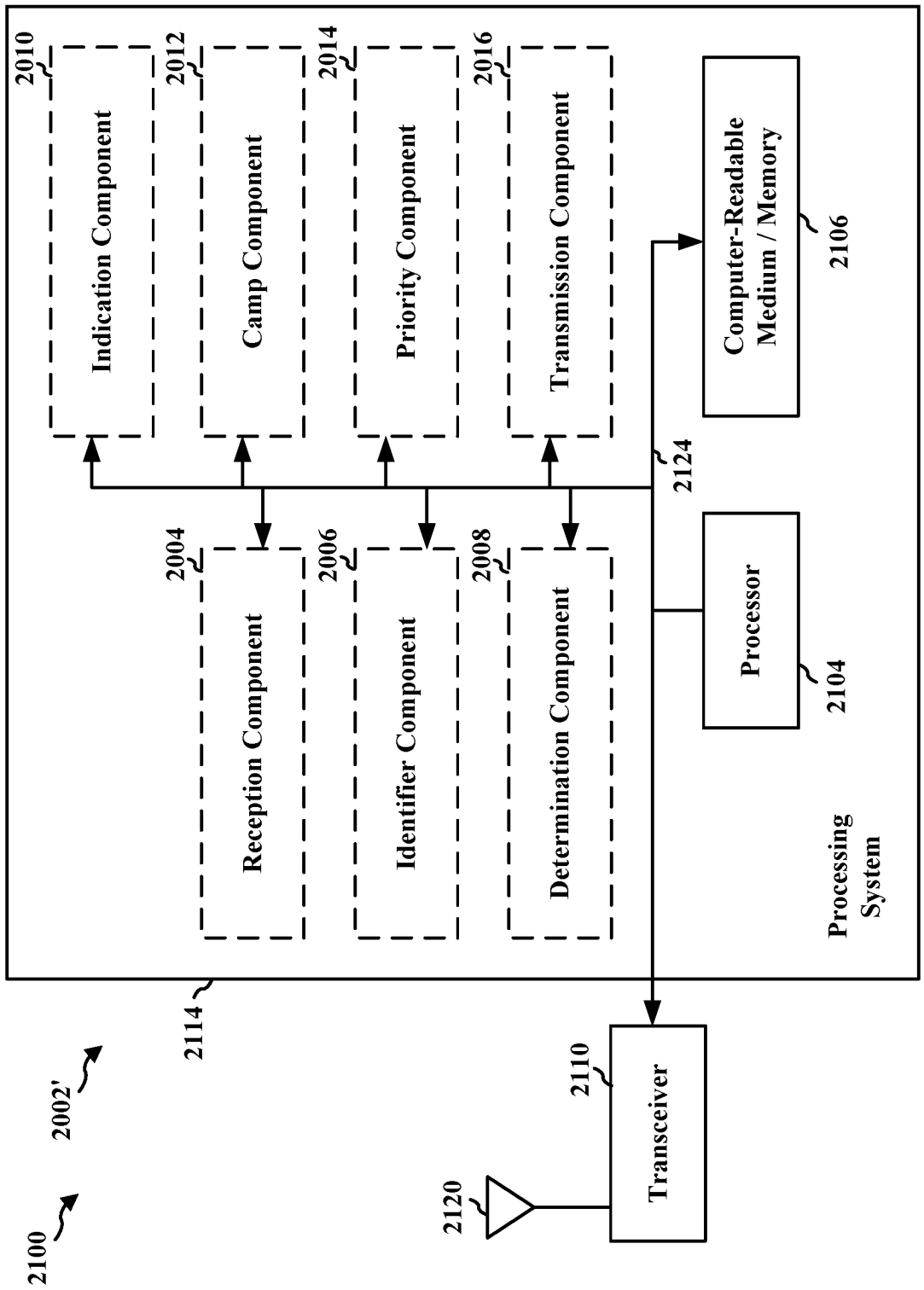
FIG. 21 is a diagram illustrating an example of a hardware implementation for an apparatus employing a processing system.

FIG. 21 is a diagram 2100 illustrating an example of a hardware implementation for an apparatus 2002' employing a processing system 2114. The processing system 2114 may be implemented with a bus architecture, represented generally by the bus 2124. The bus 2124 may include any number of interconnecting buses and bridges depending on the specific application of the processing system 2114 and the overall design constraints. The bus 2124 links together various circuits including one or more processors and/or hardware components, represented by the processor 2104, the components 2004, 2006, 2008, 2010, 2012, 2014, 2016, and the computer-readable medium/memory 2106. The bus 2124 may also link various other circuits such as timing sources, peripherals, voltage regulators, and power management circuits, which are well known in the art, and therefore, will not be described any further.

The processing system 2114 may be coupled to a transceiver 2110. The transceiver 2110 is coupled to one or more antennas 2120. The transceiver 2110 provides a means for communicating with various other apparatus over a transmission medium. The transceiver 2110 receives a signal from the one or more antennas 2120, extracts information from the received signal, and provides the extracted information to the processing system 2114, specifically the reception component 2004. In addition, the transceiver 2110 receives information from the processing system 2114, specifically the transmission component 2016, and based on the received information, generates a signal to be applied to the one or more antennas 2120. The processing system 2114 includes a processor 2104 coupled to a computer-readable medium/memory 2106. The processor 2104 is responsible for general processing, including the execution of software stored on the computer-readable medium/memory 2106. The software, when executed by the processor 2104, causes the processing system 2114 to perform the various functions described supra for any particular apparatus. The computer-readable medium/memory 2106 may also be used for storing data that is manipulated by the processor 2104 when executing software. The processing system 2114 further includes at least one of the components 2004, 2006, 2008, 2010, 2012, 2014, 2016. The components may be software components running in the processor 2104, resident/stored in the computer readable medium/memory 2106, one or more hardware components coupled to the processor 2104, or some combination thereof. The processing system 2114 may be a component of the mobile relay. Alternatively, the processing system 2114 may be the entire mobile relay.

In one configuration, the apparatus 2002/2002' for wireless communication includes means for generating an identifier that enables a UE to derive a PCI for the mobile relay device. The apparatus includes means for broadcasting the identifier. The apparatus includes means for determining if the mobile relay device is capable of supporting an additional UE based on a current load of the mobile relay device. The apparatus includes means for transmitting an indication indicating whether the mobile relay device is capable of accepting the additional UE. The apparatus includes means for receiving an indication from a base station indicating whether the base station is accepting an additional mobile relay. The apparatus includes means for determining whether to camp on the base station based on the indication from the base station as a donor base station. The apparatus further includes means for giving the base station a reduced priority in a candidate list or removing the base station from the candidate list when the indication indicates that the base station is not accepting the additional mobile relay. The aforementioned means may be one or more of the aforementioned components of the apparatus 2002 and/or the processing system 2114 of the apparatus 2002' configured to perform the functions recited by the aforementioned means.

The present disclosure relates to discovery procedures of relays in wireless communication systems. Base stations may have a limited coverage area, and including relay nodes in the wireless communication system may allow the relay node to provide additional coverage that may not be provided by the limited coverage area of a base station. Mobile relays are relays placed in a vehicle and may provide coverage to neighboring UEs, which can be in the vehicle itself or in the vicinity of the vehicle. Base stations maintain neighbor lists which contain a list of neighboring cells, and the list of neighboring cells that a UE is expected to see and potentially handover to is known and fixed. In wireless communication systems that include relays, e.g., mobile relays, the relays providing service to UEs may be mobile, such that a list of neighboring relays that the UE is expected to see on a particular relay may repeatedly change. Aspects provided herein provide a solution to the problem of dynamically updating the neighbor list sent to the UE, based on the location of the UE and/or the location of the relay. In some aspects, a network entity may send assistance information to at least one UE, in an area, where the assistance information identifies at least one mobile relay in the vicinity of the at least one UE, such that the at least one UE may discover and determine whether or not to select the at least one mobile relay for relaying communication from the UE to the network. At least one advantage of the disclosure is that the network entity may determine the neighboring mobile relays based on the distance between the UE and the neighboring mobile relays. At least another advantage of the disclosure is that a UE may be configured to discover available mobile relays in a more efficient manner, while minimizing the amount of reselections to a new mobile relay.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a mobile relay device, comprising:
 a memory; and
 at least one processor coupled to the memory and, based at least in part on information stored in the memory, the at least one processor is configured to:
  receive an indication from a base station indicating whether the base station is accepting an additional mobile relay device, wherein the mobile relay device receives the indication as system information broadcast from the base station;

determine whether to camp on the base station based on the indication from the base station as a donor base station;

determine if the mobile relay device is capable of supporting an additional user equipment (UE) based on a current load of the mobile relay device; and transmit an indication indicating whether the mobile relay device is capable of accepting the additional UE.

2. The apparatus of claim 1, further comprising a transceiver coupled to the at least one processor.

3. The apparatus of claim 1, wherein the mobile relay device broadcasts the indication as system information using a Uu interface or device-to-device communication.

4. The apparatus of claim 1, wherein the at least one processor is configured to:

generate an identifier that enables a user equipment (UE) to derive a physical cell identity (PCI) for the mobile relay device; and broadcast the identifier.

5. The apparatus of claim 4, wherein the mobile relay device broadcasts the identifier using device-to-device communication.

6. The apparatus of claim 1, wherein the at least one processor is configured to:

give the base station a reduced priority in a candidate list or removing the base station from the candidate list when the indication indicates that the base station is not accepting the additional mobile relay device.

7. A method of wireless communication at a mobile relay device, comprising:

receive an indication from a base station indicating whether the base station is accepting an additional mobile relay device, wherein the mobile relay device receives the indication as system information broadcast from the base station;

determine whether to camp on the base station based on the indication from the base station as a donor base station;

determining if the mobile relay device is capable of supporting an additional user equipment (UE) based on a current load of the mobile relay device; and transmitting an indication indicating whether the mobile relay device is capable of accepting the additional UE.

8. The method of claim 7, wherein the mobile relay device broadcasts the indication as system information using a Uu interface or device-to-device communication.

9. The method of claim 7, further comprising:

generating an identifier that enables a user equipment (UE) to derive a physical cell identity (PCI) for the mobile relay device; and broadcasting the identifier.

10. The method of claim 9, wherein the mobile relay device broadcasts the identifier using device-to-device communication.

11. The method of claim 9, further comprising:

giving the base station a reduced priority in a candidate list or removing the base station from the candidate list when the indication indicates that the base station is not accepting the additional mobile relay device.

12. An apparatus for wireless communication at a base station, comprising:

a memory; and at least one processor coupled to the memory and, based at least in part on information stored in the memory, the at least one processor is configured to:

determine if the base station is capable of supporting an additional mobile relay based on a current load of the base station; and transmit an indication indicating whether the base station is capable of accepting the additional mobile relay, wherein the base station broadcasts the indication.

13. The apparatus of claim 12, further comprising a transceiver coupled to the at least one processor.

14. The apparatus of claim 12, wherein the base station broadcasts the indication in system information.

15. A method of wireless communication at a base station, comprising:

determining if the base station is capable of supporting an additional mobile relay based on a current load of the base station; and transmitting an indication indicating whether the base station is capable of accepting the additional mobile relay, wherein the base station broadcasts the indication.

16. The method of claim 15, wherein the base station broadcasts the indication in system information.

* * * * *